United States Patent
Yasui et al.

(10) Patent No.: US 7,881,830 B2
(45) Date of Patent: Feb. 1, 2011

(54) ELECTRONIC CONTROL SYSTEM FOR CONTROLLING PLANT TEMPERATURE

(75) Inventors: Yuji Yasui, Saitama (JP); Ikue Kawasumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 463 days.

(21) Appl. No.: 12/081,896

(22) Filed: Apr. 23, 2008

(65) Prior Publication Data

US 2008/0269955 A1 Oct. 30, 2008

(30) Foreign Application Priority Data

Apr. 27, 2007 (JP) .............................. 2007-120031

(51) Int. Cl.
*G05D 23/00* (2006.01)
(52) U.S. Cl. ........................................ 700/299; 700/28
(58) Field of Classification Search ................. 700/300, 700/299, 53, 44, 28, 8
See application file for complete search history.

(56) References Cited

U.S. PATENT DOCUMENTS

| | | | |
|---|---|---|---|
| 5,353,207 A * | 10/1994 | Keeler et al. ................... 700/44 |
| 5,722,236 A | 3/1998 | Cullen et al. |
| 6,278,899 B1 * | 8/2001 | Piche et al. .................... 700/44 |
| 6,537,230 B1 * | 3/2003 | Pfeiffer et al. .............. 600/526 |
| 2004/0117040 A1 * | 6/2004 | Sayyarrodsari et al. ....... 700/29 |
| 2004/0249483 A1 | 12/2004 | Wojsznis et al. |
| 2008/0097678 A1 | 4/2008 | Huelser et al. |

FOREIGN PATENT DOCUMENTS

| | | |
|---|---|---|
| EP | 1 676 991 A2 | 7/2006 |
| GB | 2 402 499 A | 12/2004 |
| JP | 2005/044337 | 2/2005 |
| JP | 2006-183645 | 7/2006 |
| WO | 02/070873 A1 | 9/2002 |
| WO | WO 2008/015658 A2 | 2/2008 |

OTHER PUBLICATIONS

European Search Report 08008049.2-2206 dated Jul. 10, 2008.

* cited by examiner

*Primary Examiner*—Kidest Bahta
(74) *Attorney, Agent, or Firm*—Squire, Sanders & Dempsey L.L.P.

(57) ABSTRACT

Nonlinear functions (table and map) of a temperature estimation model are corrected based on outputs from a temperature sensor. An electronic control system calculates, for a plant model constructed to calculate an estimated temperature value of the plant, an estimated temperature value using a correlation model between a first parameter regarding the plant and a second parameter regarding the plant model. This control system controls the temperature of the plant based on the calculated estimated temperature value of the plant. The control system also defines a plurality of functions (Wi) in a range of a plurality of the first parameters for the correlation model, calculates correction coefficients (Kli, Kci) that adjust the height of the plurality of functions based on the output of the temperature sensor and the calculated estimated temperature value of the plant, and corrects the correlation model by the plurality of functions (Wi) and correction coefficients (Kli, Kci).

21 Claims, 32 Drawing Sheets (a)

(b)

(a) Tex_bs_mbt MAP (b) Ktex_bs_rt TABLE

ELECTRONIC CONTROL SYSTEM FOR CONTROLLING PLANT TEMPERATURE

BACKGROUND OF THE INVENTION

1. Field of the Invention

The present invention relates to a system to electronically control the temperature of a plant.

2. Description of the Related Art

WO 2002/070873 describes a device and method for diagnosing internal combustion engines and a control method of the internal combustion engines with the diagnosis device and method, while Japanese Patent Application Publication No. 2006-183645 describes a system for controlling the temperature of a plant that is a controlled object.

The technology in WO 2002/070873 features detection of catalyst degradation by defining a model used to estimate the temperature of a catalyst and comparing the output from the model and the output from a temperature sensor installed in the catalyst. When the temperature sensor output indicates a temperature equal to or lower than the light-off temperature of the catalyst, the system corrects the estimated temperature obtained from the model based on the temperature sensor output.

The technology in Japanese Patent Application Publication No. 2006-183645 features control of the temperature of a catalyst to be a predetermined target value by defining a model used to estimate the catalyst temperature and changing engine operating parameters (ignition timing and target air/fuel ratio) based on the output from the model. In the control operation, the system compares the output from the model and the output from a temperature sensor installed in the catalyst to provide a deviation therebetween on which the correction of the model's coefficient is based.

In recent years, demand for rapid warm-up of exhaust system down-stream-treatment devices (catalyst, lean NOx catalyst, selective catalytic reduction (SCR) system, etc.) of gasoline engines and diesel engines has been growing for the purpose of reducing emissions immediately after start-up of the engine. In order to minimize fuel efficiency degradation and the emissions produced before activation of the down-stream-treatment devices, monitoring the temperature of the down-stream-treatment devices and controlling control parameters (ignition timing, fuel injection amount, fuel injection pattern, etc.) of the engine are also needed so as to have an optimal temperature-rise pattern. Additionally, lean-burn gasoline engines, auto-ignition combustion engines, variable lift engines, diesel engines and some other engines discharge exhaust gas at low temperatures even after the warm-up of the engines and may not activate their down-stream-treatment devices depending on their operating conditions. There is another demand for control of the temperature of the down-stream-treatment devices for the reason that the temperature range in which the down-stream-treatment devices can satisfactorily work is limited. A possible solution to meet the demands is to install a temperature sensor on the down-stream-treatment device and to control the control parameters ignition timing, fuel injection amount, fuel injection pattern, etc.) of the engine based on the output from the temperature sensor. However, the temperature sensor installable on the exhaust system are made to deal with environmental conditions, including temperature difference, corrosive elements (water, sulfuric acid, etc.) and vibration, to which the temperature sensor is exposed, and therefore cannot allow its responsivity to reach a level at which the above-described requirements to control the temperature are fully satisfied. To solve the problem, the system in Japanese Patent Application Publication No. 2006-183645 sets a model for estimating the temperature of the down-stream-treatment device, controls the control parameters of the engine based on the output from the model, and corrects the "coefficient (constant Dcat)" of the model based on the deviation between the model output and the temperature sensor output so as to prevent the output value of the model from differing from the output value of the sensor at a steady state.

However, Japanese Patent Application Publication No. 2006-183645 employing a sequential least square method that can correct only the coefficient (constant) of linear models cannot correct nonlinear functions (table and map).

Down-stream-treatment devices often change its exothermic properties into nonlinear exothermic properties according to the temperature. In a case where the temperature of the down-stream-treatment device needs to be increased or decreased in a short period of time (e.g., post-startup rapid warm-up control and regeneration control of diesel's DPF (Diesel Particulate Filter), etc.), the technique in Japanese Patent Application Publication No. 2006-183645 cannot provide adequately accurate model outputs, which may cause an increase of emissions, fuel efficiency degradation and acceleration of down-stream-treatment-device degradation due to excessive rise of temperature. In addition, the technique in WO 2002/070873 achieves only correction of the model's coefficient/constant, and limits the correction timing to a time before the activation of the down-stream-treatment device.

SUMMARY OF THE INVENTION

Accordingly, it is desirable to realize a technology enabling correction of the nonlinear functions (table and map) of the temperature estimation model based on the output of the temperature sensor.

In order to solve the above problems, the present invention provides an electronic control system that is provided with a temperature sensor producing outputs indicative of the temperature of a plant and controls the plant temperature. This electronic control system comprises means for calculating an estimated value of the temperature of the plant using a correlation model between a first parameter regarding the plant and a second parameter of a plant model, the plant model being constructed for calculating the estimated temperature value of the plant. This electronic control system further comprises plant temperature control means for controlling the temperature of the plant based on the calculated estimated temperature value of the plant.

The electronic control system further comprises means for calculating correction coefficients (Kli, Kci) based on the output of said temperature sensor and said calculated estimated temperature value of the plant. The correction coefficients (Kli, Kci) adjust the height of a plurality of functions (Wi) each defined in a range of a plurality of the first parameters for the correlation model. The electronic control system still comprises model correcting means for correcting the correlation model by the plurality of functions (Wi) and the correction coefficients (Kli, Kci).

Even if there are other predetermined parameters (second parameters (Ccat, Cbt)), indicating nonlinear properties relative to predetermined parameters (first parameters (Tcat, Wch)) in the plant and there is a need to control with the parameters the temperature of the plant that changes over time and differs individually from plant to plant, the present invention having the above structure can control the plant temperature to a target value with high accuracy regardless of the time-lag characteristics of the temperature sensor (in the case of exhaust system temperature control). It is also possible to embody an electronic control system that can control the temperature of a part, where the temperature sensor does not exist, of a plant to a target value with high accuracy.

In an embodiment of the present invention, the electronic control system further comprises a temperature sensor model constructed to calculate an estimated output value of the temperature sensor with an input of the estimated temperature value. The correction coefficients (Kli, Kci) that adjust the height of the plurality of functions (Wi) are set so as to minimize the error between the output from the temperature sensor and the calculated estimated output value of the temperature sensor.

Even if the temperature sensor exhibits large time-lag characteristics, the electronic control system having the above structure can properly correct the correlation properties and control the plant temperature to a target value without producing a time-lag and overshoot.

In another embodiment of the present invention, the correction coefficients (Kli, Kci) are calculated according to a response-specifying control algorithm. Simultaneous update of the plurality of correction coefficients (Kli, Kci) sometimes causes mutual interference that causes the weighting error (Ewi) to exhibit oscillatory behavior, in the worst case, weighting error (Ewi) divergence. However, this technique, or the response-specifying control algorithm capable of exponentially attenuating the weighting error can solve the problems.

In yet another embodiment of the present invention, the plurality of functions (Wi) are set so as to intersect with each other in the range of the first parameter whose rate of change is higher than that of the second parameter. This allows the characteristics of nonlinear correlation around an inflection point to accurately agree with the correlation affected by individual variations and aged degradation without an excessive increase of computational loads.

In an embodiment of the present invention, the plant is an exhaust system of an internal combustion engine. In this case, even if the temperature sensor has a long response lag, the electronic control system of the embodiment can accurately control the temperature of the down-stream-treatment device installed in the exhaust system to be a target value without overshoot and significantly long response lag.

More specially, in the embodiment of the present invention, the predetermined first parameter is the temperature parameter (Tcat) of the down-stream-treatment device (three-way catalyst, lean NOx trap (LNT) and diesel particulate filter (DPF)) installed in the exhaust system, while the second parameter is the parameter (Ccat) indicative of the exothermic state of the down-stream-treatment device. Even if the exothermic properties of the down-stream-treatment device vary with age or due to individual variations, this embodiment can compensate the variations of the properties with the parameters to accurately control the temperature of the down-stream-treatment device to be the target value.

In an embodiment of the present invention, the plant is a rechargeable battery. In this case, even if the temperature sensor has a long response lag, the electronic control system of the embodiment can accurately control the temperature of the battery to be a target value without overshoot and significant response lag. In addition to this, in the case where a battery is divided into a plurality of blocks, the electronic control system of the embodiment can accurately control the temperature of a block, on which the temperature sensor is not installed, to be a target value.

In yet another embodiment in which the plant is a battery of the present invention, the predetermined first parameter is a parameter (Wch) indicative of an amount of charge to the battery, while the second parameter is a parameter (Cbt) indicative of the exothermic state of the battery. Even if the exothermic properties of the battery vary with age or due to individual variations, the electronic control system of the embodiment can compensate the variations of the properties with the parameters to accurately control the temperature of the battery to be a target value.

DETAILED DESCRIPTION OF THE PREFERRED EMBODIMENTS

1. Conventional Rapid Warm-Up Control for Catalyst

Widely-used conventional technology for reducing emissions immediately after startup of an engine, as shown in Japanese Patent Laid-Open No. 10-299631 (FIRE), is achieved by reducing the activation time of a catalyst with heat energy of exhaust gas increased (in not only temperature but also mass) by boosting the amount of intake air at a fast idle more than that in a usual idling state and retarding the ignition timing.

However, exhaust systems (4-2-1 exhaust system, etc.), which are employed for a high-performance engine to attain a high output/high torque, have a great heat dissipation area and heat capacity that absorbs the heat energy of the exhaust gas with an increase in temperature of the exhaust system, thereby reducing the speed of the temperature rise of the catalyst. Because of this, vehicles employing the high-performance engine-compatible exhaust system have a problem to reduce the activation time of the catalyst and therefore difficulty in realizing low emissions.

Figure 1:
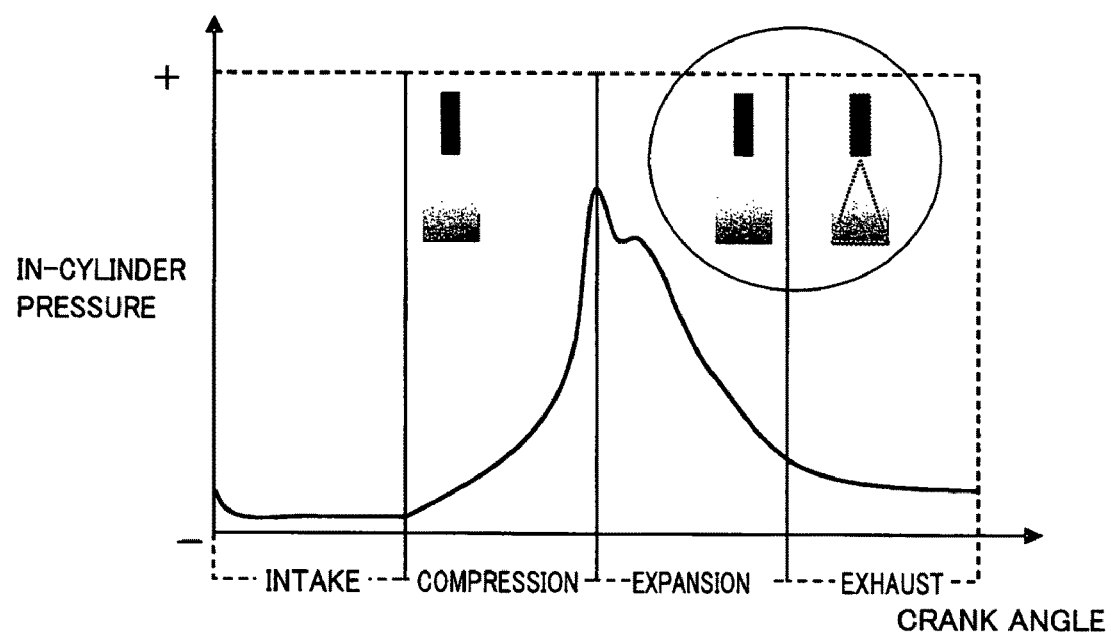
FIG. 1 illustrates the relationship between fuel injection in an expansion stroke and exhaust stroke and pressure in cylinders of an engine.

In order to solve the problems, a direct injection engine as shown in WO 2002/070873 performs an additional fuel injection in the expansion stroke and exhaust stroke (expansion/exhaust stroke injection) as shown in FIG. 1 and burns the added fuel in the cylinders and exhaust pipe to increase the exhaust temperature that reduces the activation time of the catalyst.

However, the expansion/exhaust stroke injection requires the in-cylinder gas temperature conditions in the expansion and exhaust strokes to be maintained at sufficiently high levels to fully reheat the injected fuel, otherwise unburned HC (slip HC (hydrocarbon)) increases, and in the worst case, the exhaust gas temperature is decreased due to the latent heat of the vaporized fuel added by the expansion/exhaust stroke injection, resulting in a protracted activation time of the catalyst.

In addition, the amount of fuel required to minimize the slip HC is very small. Since the operation of the direct injector is limited by a minimum fuel-injection time (Timin), even if the fuel pressure is lowered, it is difficult for the direct injector to inject a small amount of fuel to minimize the slip HC. It is of course possible to shift the flow rate characteristics toward a low flow rate so that the injector can inject an appropriate amount of fuel for the minimization of the slip HC. In this case, however, the injector cannot inject a maximum amount of fuel required by the 4-2-1 exhaust system to satisfy the maximum torque/output conditions, which make it impossible for the exhaust system to achieve both the low emission and high performance (high torque/high output).

As described above, a technique for reducing the catalyst activation time and minimizing the slip HC, while obtaining high performance of the engine is desired to the exhaust system.

2. Improvement of Rapid Warm-Up Control

One of the techniques for reducing the catalyst activation time by using the expansion/exhaust stroke injection has already been described above, that is, a method in which the exhaust gas temperature is increased by burning the fuel that is injected in the expansion and exhaust strokes in the cylinders or exhaust pipe. This method, however, has a great difficulty in fully burning the fuel because the temperature of the combustion gas in the cylinders or the exhaust gas during the warming-up time of the just-started engine is still low.

To solve the problem, a technique for burning the fuel at the catalyst is studied as a possible solution for burning the fuel injected in the expansion and exhaust strokes at lower temperatures.

Figure 2:
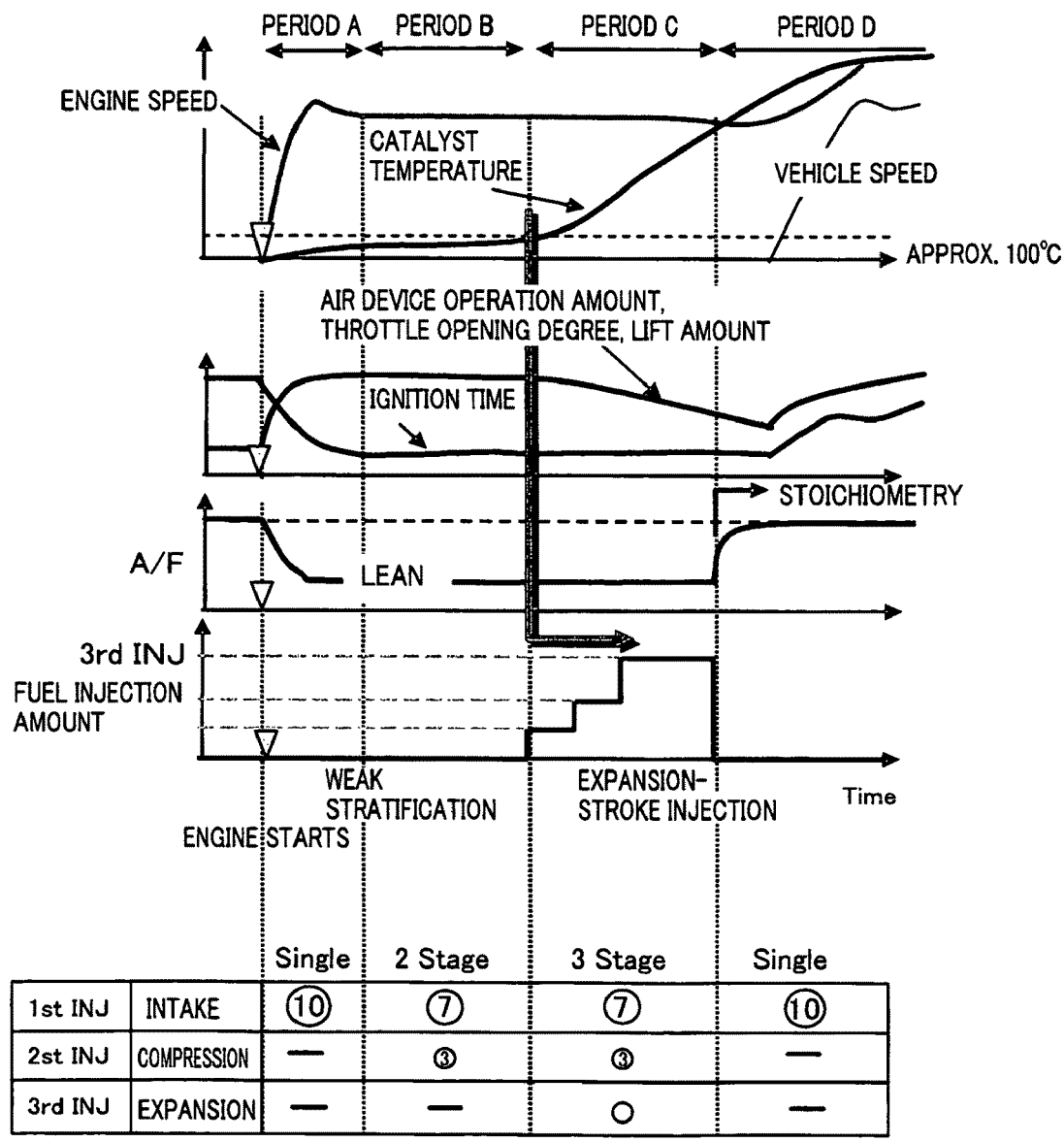
FIG. 2 is a timing chart of a catalyst rapid warm-up control.

In this technique, as shown in FIG. 2, a large amount of HC is unburned in period A immediately after the engine starts because the temperature of cylinder walls and pistons is not high. Thus, a higher priority is given on reduction of HC than warm-up of the catalyst and fuel injection is performed in an intake stroke to increase homogeneity of a mixture.

Next, the exhaust temperature is increased to accelerate the warm-up of the catalyst in period B. Then, the ignition timing is retarded by 7 to 15 degrees after the TDC (Top Dead Center), and the fuel injection is split into two for the intake stroke and compression stroke. Suppose the first and second injection timings are θinj1 and θinj2, respectively, θinj1 and θinj2 are set to −90 to −120 degrees (90 to 120 degrees after intake top) and −240 to −290 degrees (240 to 290 degrees after intake top), respectively, thereby weakly stratifying the mixture. Therefore, while the firing timing is advanced to improve combustion stability, the termination time of the combustion is retarded (i.e., extension of combustion period). In short, while the unburned HC is decreased, the exhaust gas temperature is increased.

In period C, the expansion/exhaust stroke injection is initiated when a part of the catalyst, that is, a surface of the catalyst starts activation, in other words, when the catalyst temperature reaches approximately 100° C. to burn the fuel over the catalyst. However, the catalyst having activation only on its surface or front half cannot burn substantial fuel thereon. To burn more fuel, the amount of fuel injected at the expansion and exhaust strokes is increased, as shown in FIG. 2, in accordance with the temperature rise of the catalyst, in other words, with the activation degree of the catalyst.

However, the optimal amount of the fuel Ti3rdRQ required for the expansion/exhaust stroke injection to minimize the slip HC is very small. Even if the fuel pressure is set to the lowest, the optimal amount is still smaller than the fuel amount injected during the minimum fuel injection time Timin of the injector.

In addition to the use of residual oxygen in the exhaust gas to burn the fuel at the catalyst, the catalyst having an oxygen storage capacity can use the oxygen stored therein to burn the fuel. If the amount of fuel in the exhaust gas and the oxygen concentration are periodically changed, the ratio of the fuel and oxygen on the catalyst surface layer exhibits time-lag characteristics due to the oxygen storage capacity. Even if the fuel injection amount Ti3rd injected through the expansion/exhaust stroke injection is greater than the required value Ti3rdRQ, the sufficient oxygen stored in the catalyst can oxidize the fuel on the surface layer thereof, thereby reducing the slip HC.

Figure 3:
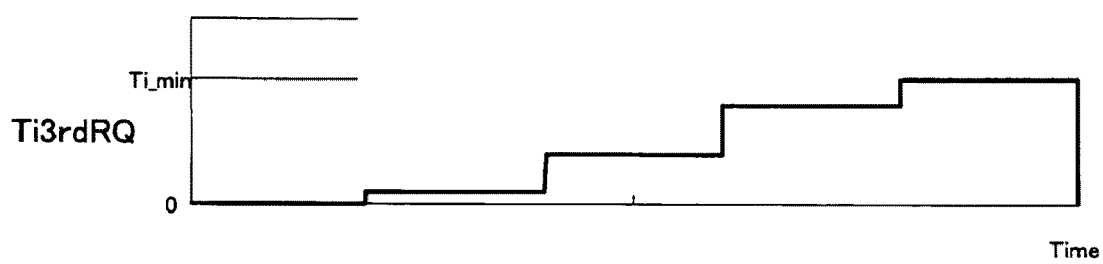
FIGS. 3A and 3B illustrate the principle of expansion/exhaust stroke injection.
Figure 3:
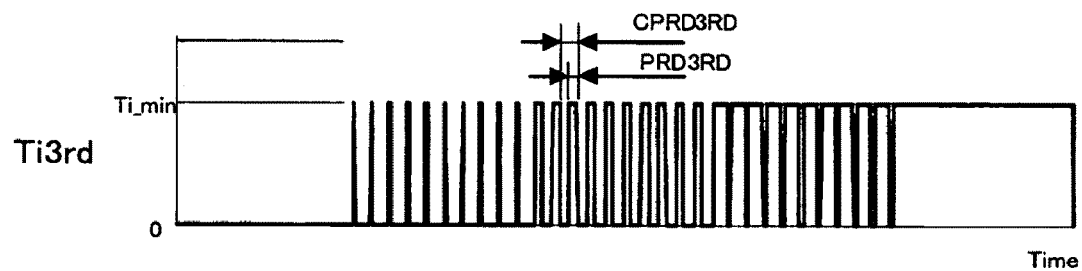

Accordingly, as shown in FIG. 3, the use of the oxygen storage capacity of the catalyst removes the constraints of Timin of the injector. In FIG. 3, based on the required value Ti3rdRQ, the ratio Rti3rd of the expansion/exhaust stroke injection to a predetermined cycle period PRD3RDMAX (e.g., 8 to 10 cycles) and the injection period PRD3RD are defined by the following equations. The intermittently performed expansion/exhaust stroke injection makes its substantial effect equal to Ti3rdRQ under the constraints of Timin.

$$Rti3rd = \frac{Ti3rdRQ}{Timin} \quad (2\text{-}1)$$

$$PRD3RD = Rti3rd \cdot PRD3RDMAX \quad (2\text{-}2)$$
$$= \frac{Ti3rdRQ}{Timin} PRD3RDMAX$$

Where the predetermined period PRD3RDMAX is set to eight combustion cycles and the required value Ti3rdRQ for the expansion/exhaust stroke injection is one-fourth of the minimum fuel injection time Timin, for example, a fuel intermittently injected for Timin each in two cycles, one-fourth of the eight combustion cycles, is equivalent to a fuel injected for ¼ of Timin in every cycle. In this example, the injection ratio Rti3rd is one-fourth, while the injection period, that is the number of combustion cycles for performing injection PRD3RD, is 8/4=2.

FIG. 3 illustrates the above relationship in the form of pulse-width modulation. The width of CPRD3RD in FIG. 3 represents the predetermined cycle period PRD3RDMAX (eight cycles in the above example) and corresponds to a pulse period of the pulse width modulation. The number of combustion cycles PRD3RD for performing the injection corresponds to a pulse width of the pulse width modulation.

FIG. 3(a) illustrates the required value Ti3rdRQ for the expansion/exhaust stroke injection. The required value denotes a value of fuel injected to each cylinder over the whole combustion cycle. As shown in FIG. 3(a), the required value Ti3rdRQ is smaller than the minimum fuel injection amount (injection time) Timin of the injector and therefore cannot be satisfied according to regular injection. FIG. 3(b) represents the number of combustion cycles PRD3RD, in which the intermittent injection is performed to meet the required value Ti3rdRQ shown in FIG. 3(a), in the form of pulse width modulation. Specifically, the pulse width in FIG. 3(b) represents a value corresponding to the number of the expansion/exhaust stroke injection intermittently performed in a predetermined cycle period.

Since the expansion/exhaust stroke injection performed in all cylinders supplies excess fuel because of the constraints of Timin and increases slip HC, the expansion/exhaust stroke injection is performed in a specific cylinder or specific cylinders. For example, the expansion/exhaust stroke injection is performed only in cylinder #1. In the exhaust system designed for high-output engines, it is rare that exhaust from each cylinder uniformly flows toward the catalyst as shown in FIG. 4(a). The exhaust gas flows into different areas as shown in FIG. 4(b). FIGS. 4(a) and 4(b) schematically illustrate the cross section of a honeycomb catalyst and the areas (#1Cyl, #2Cyl, #3Cyl, #4Cyl) illustrated by different hatch patterns are the area where the exhaust from each cylinder of a four-cylinder engine flows into.

The intermittent fuel injection in FIG. 3 reduces the slip HC by utilizing the oxygen storage capacity of the catalyst, however, the expansion/exhaust stroke injection performed in the specific cylinder cannot utilize the oxygen storage capacity of the entire catalyst in the exhaust system designed for high-output engines, accordingly diluting the effect of decreasing the slip HC.

Referring to FIG. 4(b), for example, a second cylinder (#2Cyl), a fourth cylinder (#4Cyl), a first cylinder (#1Cyl) and a third cylinder (#3Cyl) are switched in this order to change the cylinders where the expansion/exhaust stroke injection is performed. Such a rotation order of the cylinders is selected so that a honeycomb-catalyst's area through which an exhaust gas flowing from a cylinder in which the last injection had been performed and a honeycomb-catalyst's area through which an exhaust gas will flow from a cylinder in which the next injection will be performed are as far away from each other as possible. Thus determined rotation order enables full use of the oxygen storage capacity of the catalyst with the use of the biased flow distribution of the exhaust gas in the exhaust system for high output engines. When the expansion/exhaust stroke injection is performed in a cylinder, the injected fuel flows into a differentiated section of the honeycomb of the catalyst, which secures some areas where the fuel does not in effect reaches, making the oxygen storage time longer in the other areas of the catalyst. The slip HC of the fuel passing through the other areas next time is thus reduced.

Figure 5:
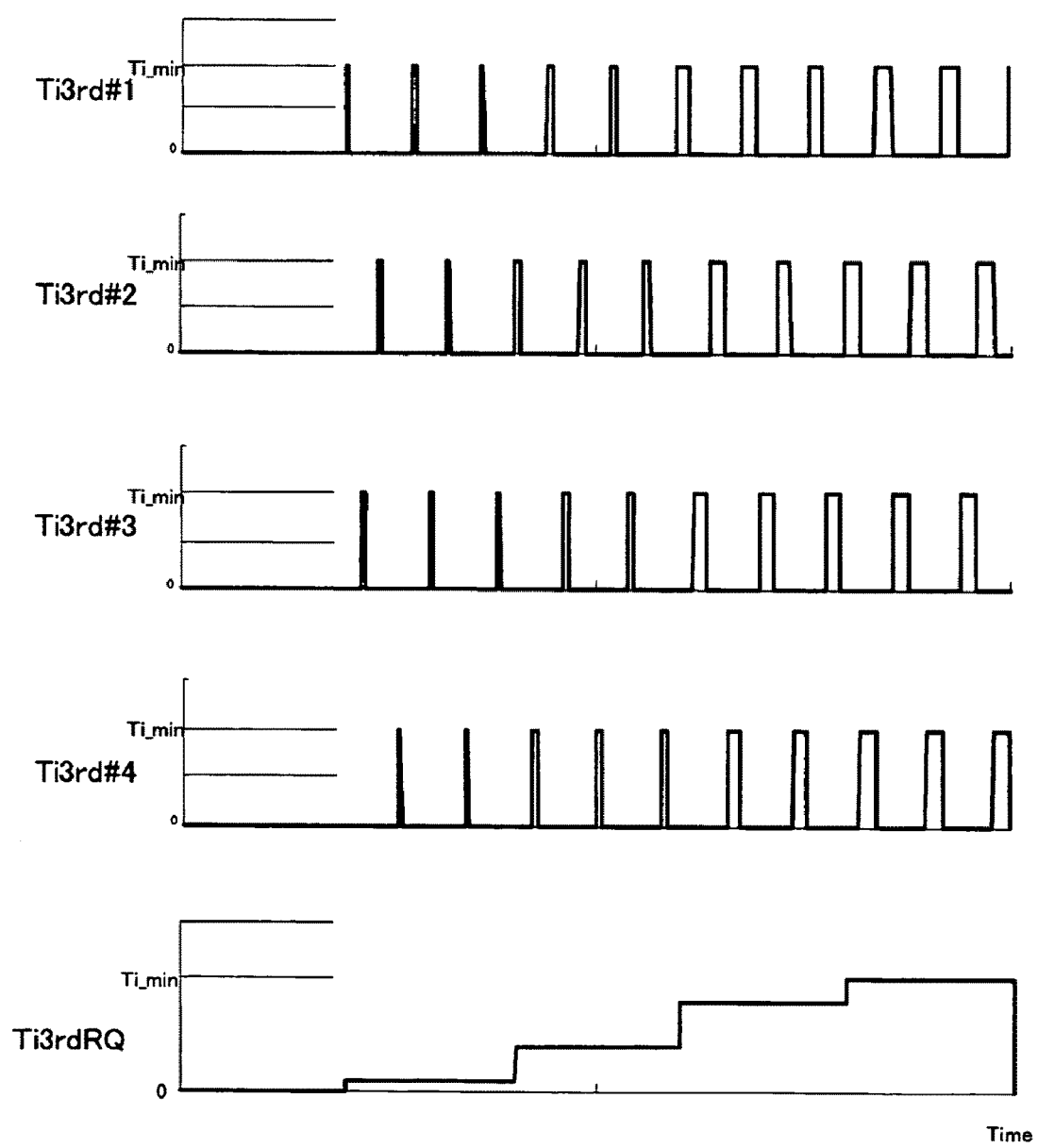
FIG. 5 illustrates timings of the expansion/exhaust stroke injection with cylinders in rotation.

FIG. 5 shows fuel injection amounts Ti3rd in each cylinder relative to required injection amounts Ti3rdRQ when the expansion/exhaust stroke injection is performed in a four-cylinder engine in rotation. The injections to each cylinder (#1, #2, #3, #4) are represented in the form of pulses whose widths represent the number of combustion cycles PRD3RD in which intermittent injection is performed in a predetermined combustion cycle period. The rotation period is optimized according to: the capacity and layout of the catalyst, the temperature, coolant temperature and oil temperature at the start-up of an engine, and the required temperature raising property for the catalyst.

3. Achieving Highly-Precise Expansion/Exhaust Stroke Injection

The injection timing and injection amount of the expansion/exhaust stroke injection may be controlled by setting them in advance so that the relationship between catalyst temperature Tcat and the expansion/exhaust stroke injection is the relationship shown in FIG. 2 with respect to time after the engine started.

However, since there are infinite combinations of the variations in ambient temperature TA, the warm-up conditions of the catalyst at start-up of an engine and the degraded state of the catalyst, proper control of the expansion/exhaust stroke injection to deal with the all combinations is impossible by the above technique. For example, if the initiation timing or additional injection timing of expansion/exhaust stroke injection is too early, the fuel given by the expansion/exhaust stroke injection cannot be fully burned at the catalyst, resulting in an increase of the slip HC. On the other hand, if the initiation timing or additional injection timing of the expansion/exhaust stroke injection is too late, the late injection protracts the activation time of the catalyst, resulting in an increase in emissions of toxic exhaust-gas components such as HC, Nox and CO.

To solve the problem, it is desired to monitor the activation state of the catalyst and to control the expansion/exhaust stroke injection according to the monitored state. One of the possible techniques is to install a temperature sensor that observes the catalyst temperature Tcat on the catalyst to control the expansion/exhaust stroke injection based on the output Tcsns of the temperature sensor.

Figure 6:
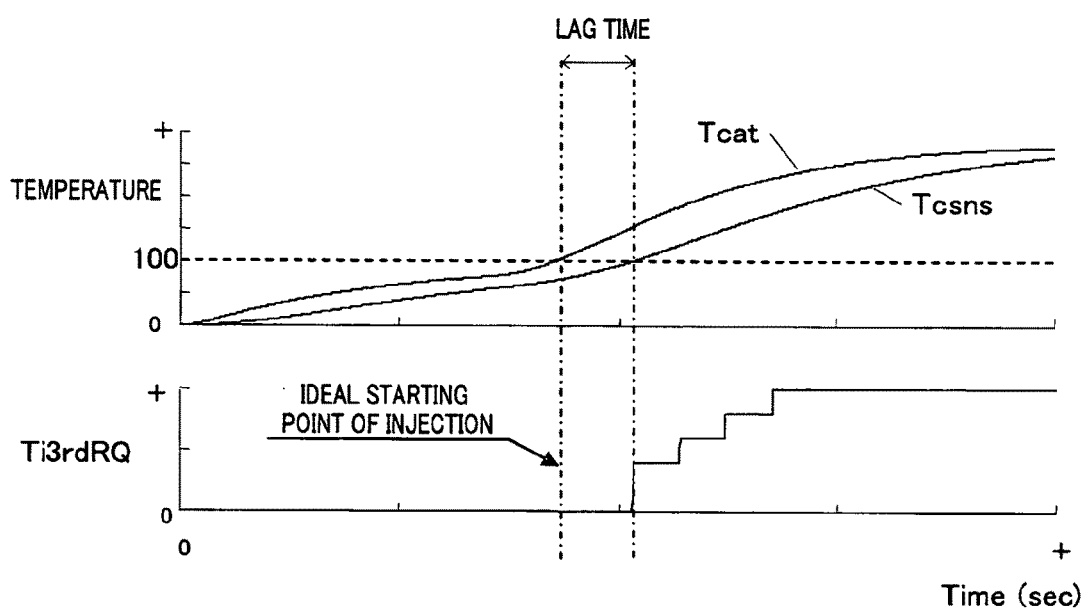
FIG. 6 illustrates the timing of the expansion/exhaust stroke injection performed with a temperature sensor.

However, the temperature sensor, which is exposed to high temperatures and water vapor and sulfide gas present in exhaust gas, is liable to suffer mechanical degradation, such as corrosion, and therefore has difficulty in maintaining its responsiveness at high levels. Accordingly, the sensor output Tcsns is delayed as compared with the catalyst temperature Tcat. The control of the expansion/exhaust stroke injection based on the delayed sensor output develops a delay in the initial timing of the expansion/exhaust stroke injection as shown in FIG. 6, and therefore the activation time of the catalyst is also delayed.

Figure 7:
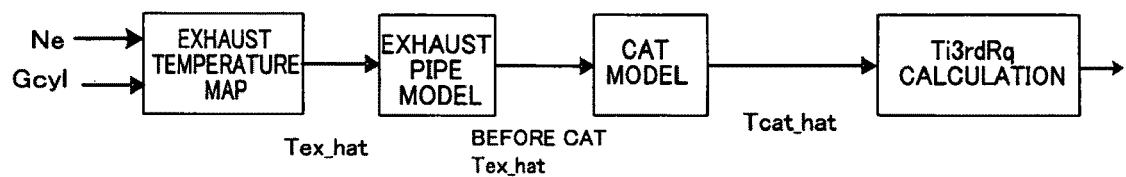
FIG. 7 is a block diagram of the expansion/exhaust stroke injection system with a thermal model.
Figure 8:
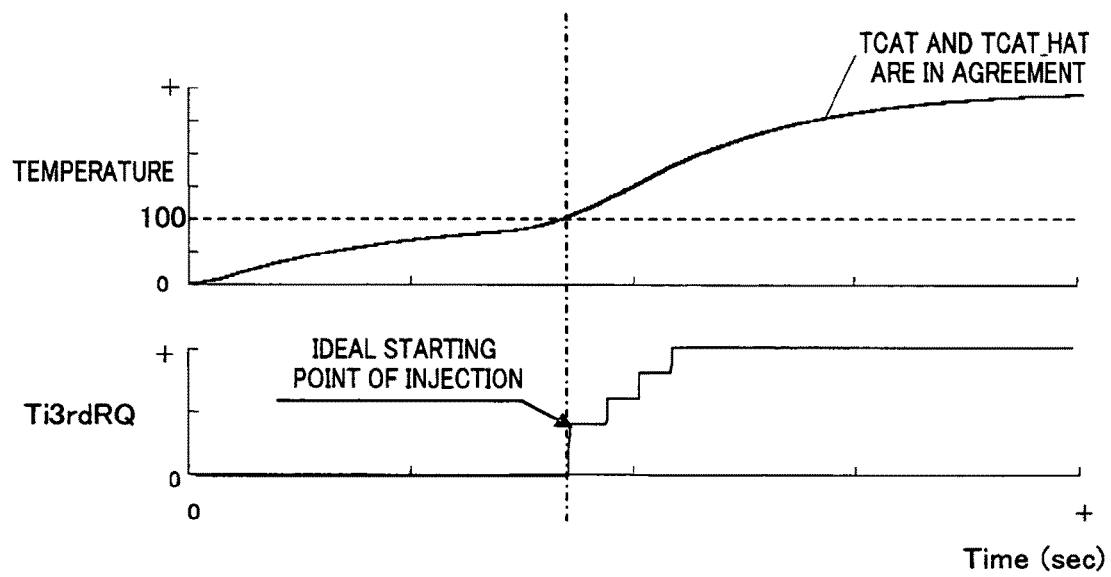
FIG. 8 illustrates the timing of the expansion/exhaust stroke injection, for a new catalyst, controlled based on a thermal model.

Another possible technique includes the one shown in FIG. 7. An estimated value Tex_hat of the exhaust system temperature is obtained from an exhaust temperature map based on the intake air amount to the engine Gcyl and engine speed Ne. A thermal model for estimating the temperature upstream of the catalyst (upstream of CAT) is set from an exhaust pipe model. The expansion/exhaust stroke injection is controlled based on the estimated value Tcat_hat of the catalyst temperature obtained from the CAT model (catalyst model). This technique allows the actual catalyst temperature Tcat to agree with the estimated value Tcat_hat as shown in FIG. 8 under a degradation condition (e.g., new condition) of the catalyst in which the thermal model is set, thereby performing the expansion/exhaust stroke injection in perfect timing.

Figure 9:
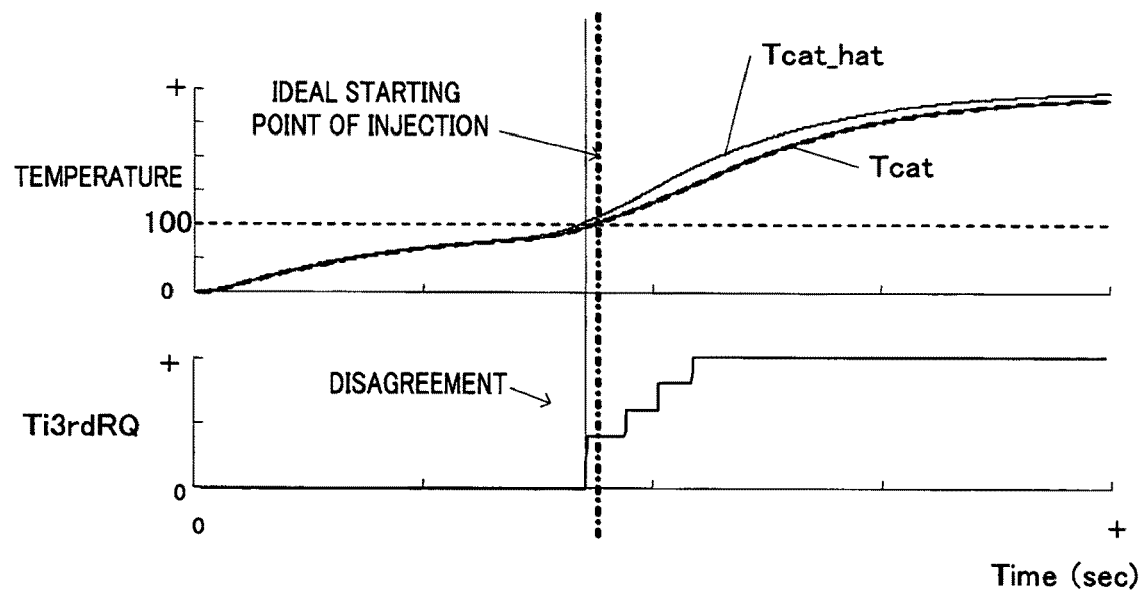
FIG. 9 illustrates the timing of the expansion/exhaust stroke injection, for a degraded catalyst, controlled based on the thermal model.

However, the changes in the degradation condition of the catalyst (i.e., the catalyst's degradation is advanced) produces an error between Tcat and Tcat_hat. As a result, the expansion/exhaust stroke injection cannot be performed in perfect timing as shown in FIG. 9, which causes protraction of the catalyst's activation time and an increase of the slip HC.

Figure 10:
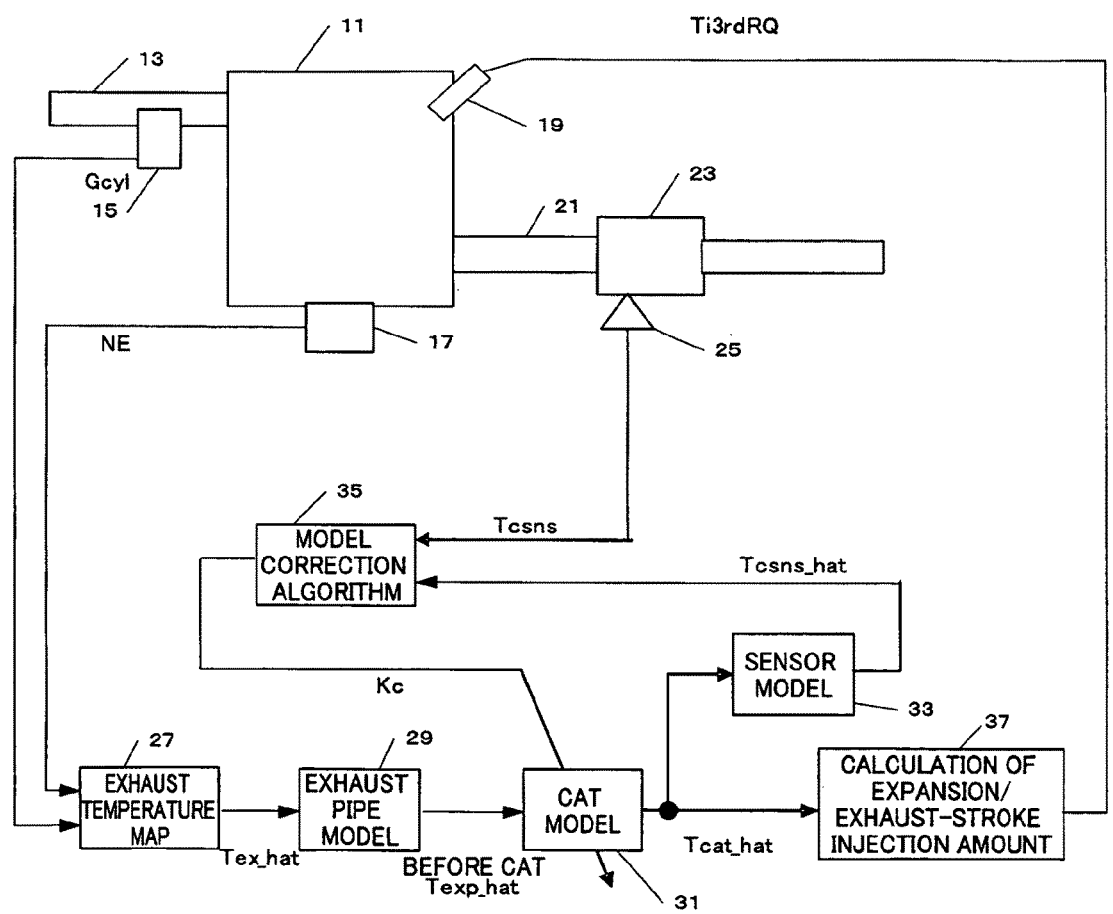
FIG. 10 is a block diagram showing the structure of the expansion/exhaust stroke injection control system using the temperature sensor and the thermal model.

In an embodiment of the present invention, as shown in FIG. 10, a model correction algorithm 35 adapts a model parameter of a catalyst (CAT) model 31 so that the sensor output Tcsns from the temperature sensor 25 attached to the catalyst 23 agrees with the output Tcsns_hat obtained from a temperature sensor model 33.

Figure 11:
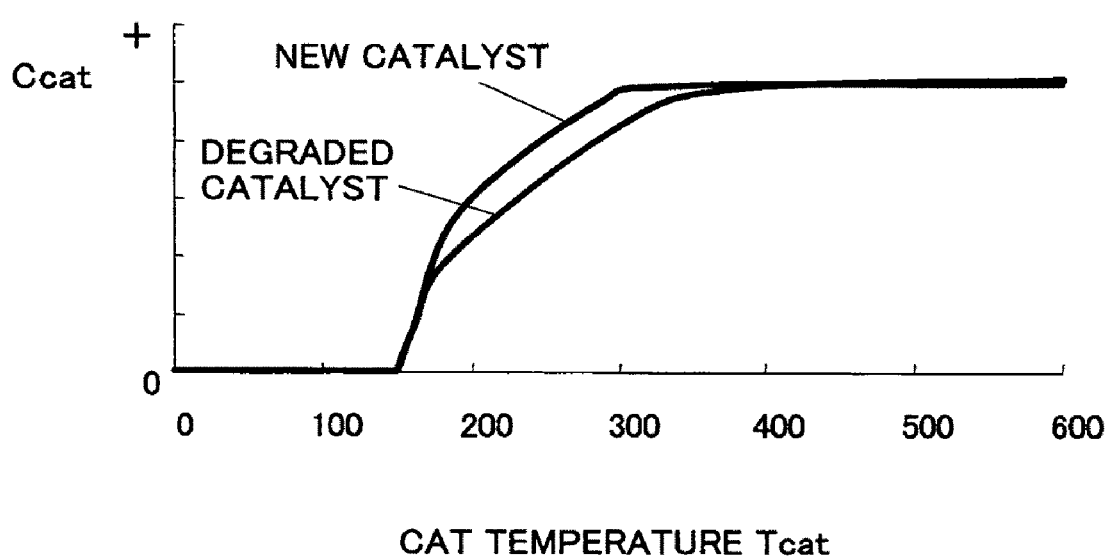
FIG. 11 is a map showing a catalyst reaction coefficient Ccat.

The problem arising now is the variations of catalyst's reaction heat coefficient Ccat according to the degradation of the catalyst. The catalyst's reaction heat coefficient Ccat is used for defining the reaction heat of a catalyst according to engine loads (i.e., intake air amount Gcyl) which will be described in detail later. As shown in FIG. 11, Ccat exhibits nonlinear characteristics relative to catalyst temperatures and the characteristics nonlinearly change with the advance of degradation (the change is different from offset and fixed rate change). The nonlinear characteristics prevent application of well-known recursive identification algorithms, such as a sequential least square method, to the correction of the catalyst model 31 based on Tcsns. Although neural networks are available to learn the tabular/mapped characteristics, the sequential learning (reinforcement learning) of the neural networks lacks stability and could provide erroneous learning at high rates, therefore it is prudent to apply the neural networks to the control technique according to this invention.

The sequential least square method, fixed gain method, sequential retransmission nonlinear least square method and other methods, which can merely identify a constant used for multiplying the variable or constant in the model, cannot identify the tabular characteristics as shown in FIG. 11.

To solve the problem, a correction technique to meet the characteristics of the previously set reaction heat coefficient of a catalyst with the characteristics of an actual degraded catalyst condition will be proposed below.

Model Correction Algorithm

Figure 12:
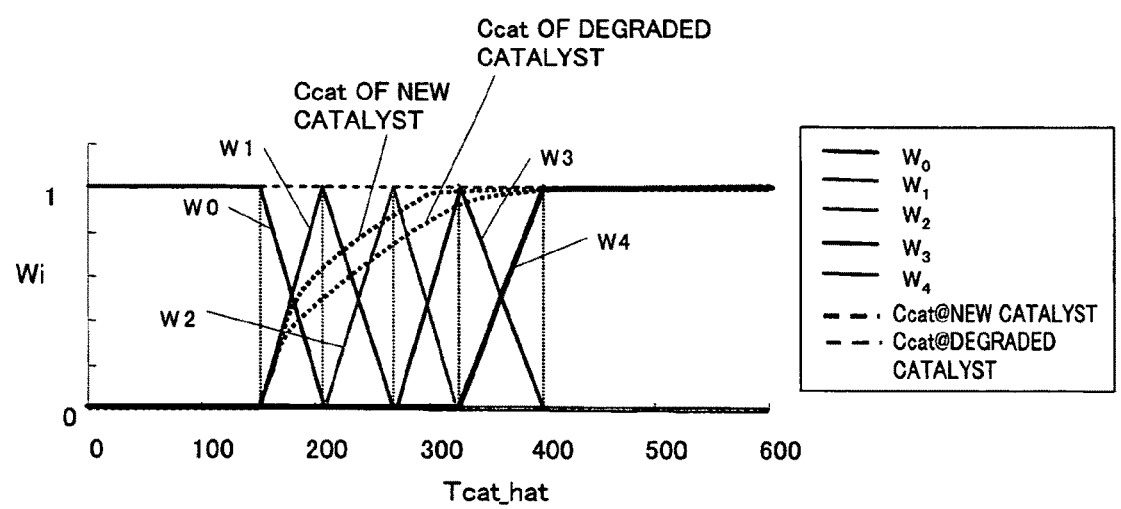
FIG. 12 illustrates the relationship of weighting functions Wi in a model correction algorithm.

The model correction algorithm 35 shown in the block diagram of FIG. 10 will be described below. First, a plurality of weighting functions Wi that intersect with each other are set relative to CAT estimated temperatures Tcat_hat as shown in FIG. 12. The Wi is set so that the sum total of the plurality of functions intersecting with each other is equal to the maximum value of each function ("1" in FIG. 12), and also set so that the plurality of functions intersect with each other in a region where the catalyst's reaction heat coefficient Ccat varies according to degradation conditions.

Figure 13:
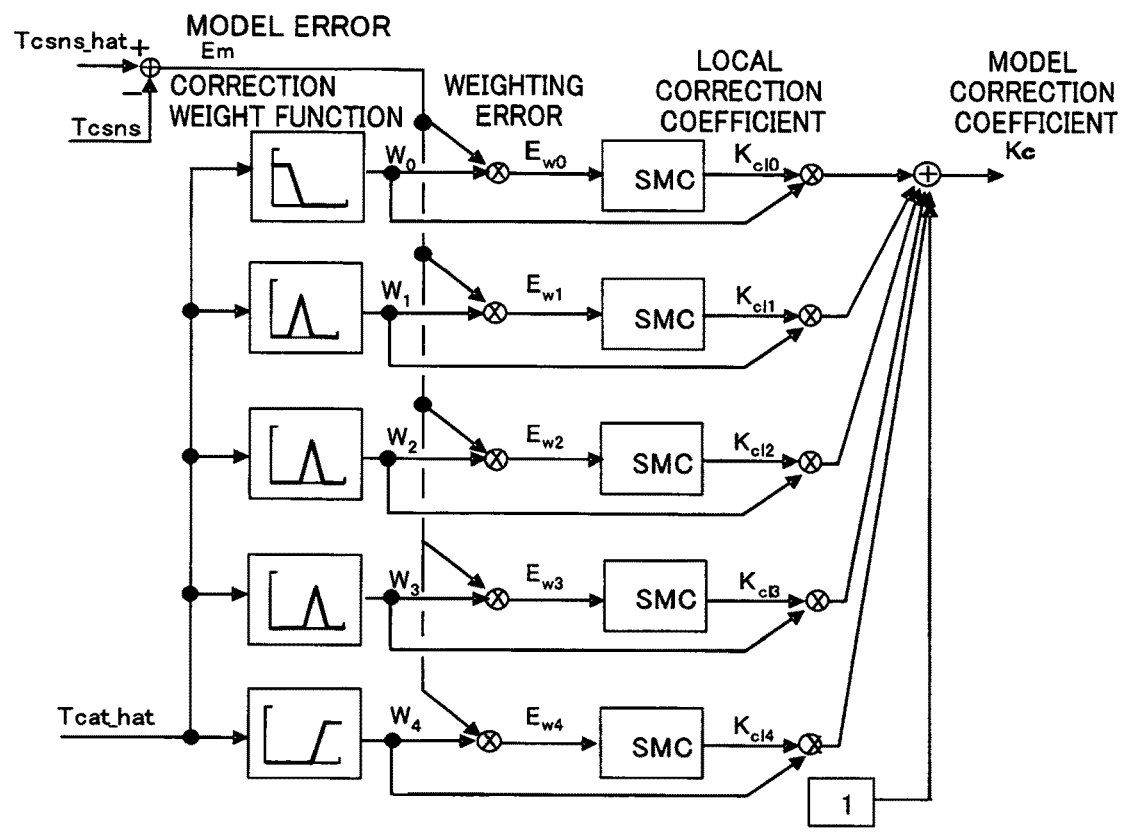
FIG. 13 is a functional block diagram showing the structure of a model correction algorithm.

Next, a model correction algorithm (VENUS: Self-VErifying Non-linear model based control for mUlti-state System) shown in FIG. 13 is constructed with Wi. In VENUS, an error between temperature sensor output Tcsns and estimated sensor-output value Tcsns_hat obtained from the thermal model, that is, a model error Em is calculated by the following equation.

$$Em(k)=Tcsns(k-1)-Tcsns\_hat(k-1) \quad (3\text{-}1)$$

Based on the CAT estimated temperature value Tcat_hat (k−1) obtained from the thermal model, a correction weight Wi (i=0 to 4) is determined by referring to the map in FIG. 12 (3-2), and a weighting error Ewi (i=0 to 4) is calculated.

$$Ewi(k)=Wi(k)Em(k)(i=0 \text{ to } 4) \quad (3\text{-}3)$$

Although both the Ccat and the correction weighting function Wi are set relative to the CAT estimated temperatures in this embodiment, the Ccat can be set relative to the engine load Gcyl or temperatures upstream of the catalyst and the correction weighting function Wi also can be set relative to these values to construct the model correction algorithm.

The structure depicted with the functional blocks in FIG. 10 is realized by an electronic control unit (ECU). The ECU is a computer and includes a processor (CPU), a random access memory providing a work space for the CPU, a read-only memory (ROM) for storing computer programs and data, and an input/output interface.

A feedback controller (Sliding Mode Controller (SMC) in FIG. 13) is set to each Ewi, and each feedback controller determines a local correction coefficient Kcli (i=0 to 4) relative to each Tcat_hat region (each weighting function) by the following equations.

As the feedback controller, in addition to SMC, a proportional integral derivative (PID) control, an optimizing control, a backstepping control, an H-infinity (H∞) control or the like is available. Especially, the SMC and backstepping control that can prevent interference of each local correction coefficient Kcli by exponentially converging each Ewi are preferred.

$$Kcli(k) = Kcl\_rch\_i(k) + Kcl\_nl\_i(k) + Kcl\_adp\_i(k)(i = 0 \text{ to } 4) \quad (3\text{-}4)$$

$$Kcl\_rch\_i(k) = -Krch\_l\sigma l\_i(k) \quad (3\text{-}5)$$

$$Kcl\_nl\_i(k) = -Knl\_l\text{sign}(\sigma l\_i(k)) \quad (3\text{-}6)$$

$$Kcl\_adp\_i(k) = -Kadp\_l\sum_{j=0}^{k}\sigma l\_i(j) \quad (3\text{-}7)$$

$$\sigma l\_i(k) = Ewi(k) - S1Ewi(k-1) \quad (3\text{-}8)$$

where:

Krch_l, Knl_l, Kadp_l: feedback gain

Sl: switching function setting parameter (−<Sl<0)

Furthermore, a model correction coefficient Kc is determined using the local correction coefficient Kcli and correction weight Wi (i=0 to 4) by the following equation.

$$Kc(k) = 1 + \sum_{j=0}^{k} Wi(k)Kcli(k) \quad (3\text{-}9)$$

Thermal Model

Next, a description will be made about a thermal model determining a CAT estimated temperature value Tcat_hat and an estimated temperature-sensor output value Tcsns_hat.

First, an estimated temperature value Tex_hat of an exhaust port can be obtained with a preset map and first order lag element as follows.

$$Tex\_bs(k) = Tex\_bs\_mbt(k)Ktex\_bs\_rt(k) \quad (3\text{-}10)$$

Figure 14:
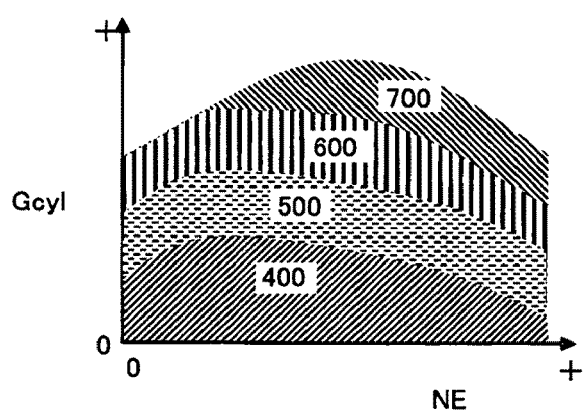
FIG. 14 is a map used in the process of calculating estimated temperature values of an exhaust port.
Figure 14:
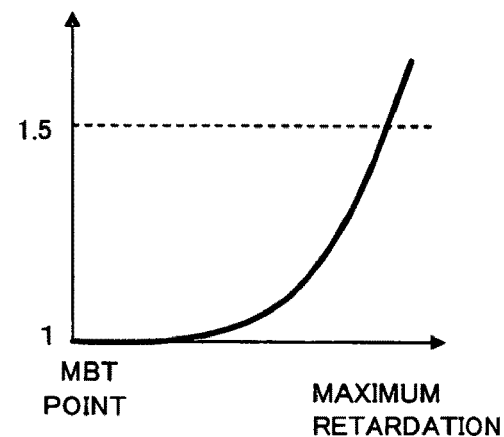

Tex_bs_mbt(k) is obtained by searching FIG. 14A based on the engine speed NE (k) and the intake air amount Gcyl(k) (3-11).

Ktex_bs_rt(k) is obtained by searching FIG. 14B based on an amount of ignition retardation from an MBT point (3-12).

$$Tex\_hat(k) = -KtexTex\_hat(k-1) + (1-Ktex)Tex\_bs(k) \quad (3\text{-}13)$$

where, Ktex: port lag coefficient (−1<Ktex<0, ex)−0.95)

Since higher loads (large Gcyl) increase an amount of heat, the exhaust temperature increases. When an engine runs at high speeds in which time for one cycle is shorter, the exhaust gas temperature becomes higher than that at medium speeds because of lack of an adequate combustion time in the cylinders. When an engine runs at low speeds, the exhaust gas temperature becomes higher than that at medium speeds because the low speeds that lower the combustion rate due to reduction of flow rate in the cylinders extend the combustion period.

Next, the equation to calculate an estimated temperature value Texp_hat of the exhaust gas upstream of the CAT can be obtained from the following equation based on a heat difference equation.

$$\frac{Texp\_hat(k) - Texp\_hat(k-1)}{\Delta T} = Aexp(Texp(k-1) - TA(k-1)) + \frac{BexpGcyl(k-1)}{LexpGcyl\_max}(Tex(k-1) - Texp\_hat(k-1))$$

The first term on the right hand side of this equation represents an advective term, and the second term the heat transmission term.

The following equation is derived from the above equation.

$$Tex\_hat(k) = \left(\begin{array}{c} 1 + Aexp\Delta T - \\ \frac{Bexp\Delta TGcyl(k-1)}{LexpGcyl\_max} \end{array}\right) Texp\_hat(k-1) + \quad (3\text{-}14)$$

$$\frac{Bexp\Delta TGcyl(k-1)}{LexpGcyl\_max} Tex(k-1) - Aexp\Delta TTA(k-1)$$

where:

Aexp, Bexp: thermal model parameters, e.g., Aexp=−0.01, Bexp=−0.18

Lxp: exhaust pipe length e.g., Lexp=0.4 m

Gcyl_max: maximum intake air amount of an engine, e.g., Gcyl_max=60 g/s

TA: ambient temperature

ΔT: control cycle

Furthermore, the equation to calculate a CAT estimated temperature value Tcat_hat can be obtained by the following equation based on the heat difference equation added with an exothermic term.

$$\frac{Tcat\_hat(k) - Tcat\_hat(k-1)}{\Delta T} = Acat\left(\begin{array}{c} Tcat(k-1) - \\ TA(k-1) \end{array}\right) + \frac{BcatGcyl(k-1)}{LcatGcyl\_max}\left(\begin{array}{c} Texp(k-1) - \\ Tcat\_hat(k-1) \end{array}\right) + Ccat(k)Kc(k)Gcyl(k)$$

The first term on the right hand side of this equation represents an advective term, the second term a heat transmission term, and the third term an exothermic term.

Figure 15:
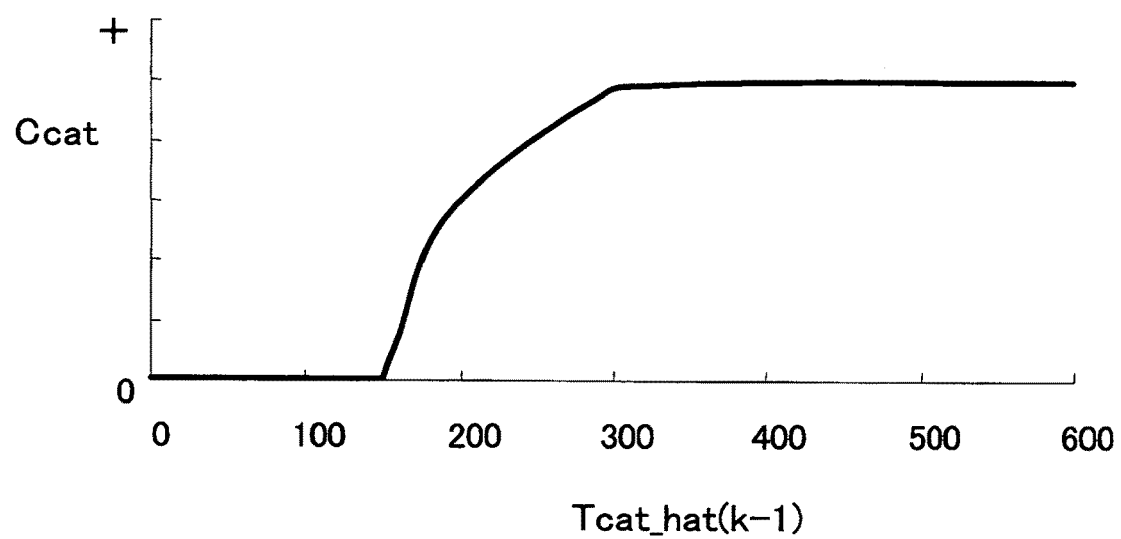
FIG. 15 illustrates the relationship between estimated temperature values of catalyst and the catalyst reaction coefficient Ccat.

The following equation is derived from the above equation.

$$Tcat\_hat(k) = \left(\begin{array}{c} 1 + Acat\Delta T - \\ \frac{Bcat\Delta TGcyl(k-1)}{LcatGcyl\_max} \end{array}\right) Tcat\_hat(k-1) + \quad (3\text{-}15)$$

$$\frac{Bcat\Delta TGcyl(k-1)}{LcatGcyl\_max} Tex(k-1) -$$

$$Acat\Delta TTA(k-1) + Ccat(k)Kc(k)\Delta TGcyl(k)$$

where:

Ccat(k) represents a catalyst's reaction heat coefficient obtained by searching the map in FIG. 15 from Tcat_hat(k−1).

Acat, Bcat: thermal model parameters, e.g., Acat=−0.01, Bcat=−0.18

Lcat: exhaust pipe length, e.g., Lcat=0.2 m

Equation 3-15 is characterized in that the exothermic coefficient Ccat of the exothermic term is sequentially adjusted according to the degradation conditions of the catalyst by the model correction algorithm (VENUS).

As a matter of course, the latest calculated value can be used as an initial value of the correction coefficient Kc for the next calculation value. Alternatively, it is also possible to incorporate a learning function so as to use a value, which is obtained by statistically processing the calculated values at each time, as an initial value.

The estimated temperature-sensor output value Tcsns_hat can be obtained with the following first order lag element.

$$Tcsns\_hat(k) = -Ks Tcsns\_hat(k-1) + (1+Ks)Tcat\_hat(k) \quad (3\text{-}16)$$

where,

Ks: sensor time-lag coefficient, e.g., Ks=−0.998

Figure 16:
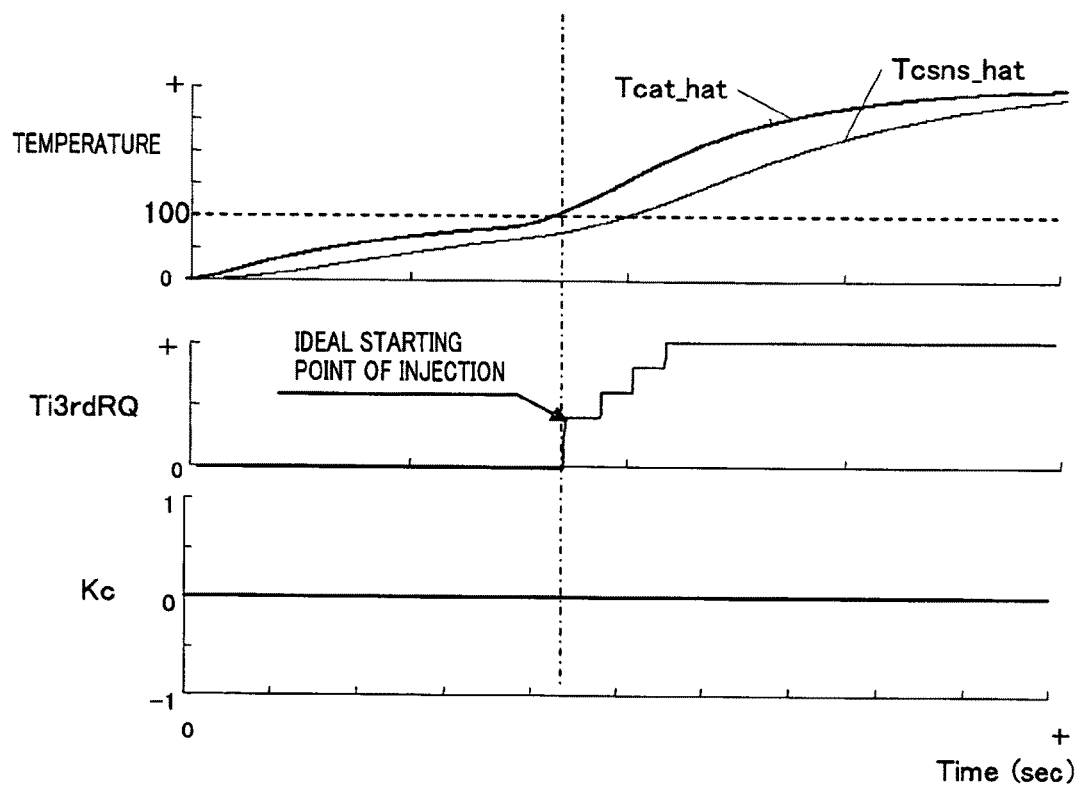
FIG. 16 illustrates a result of the expansion/exhaust stroke injection control, with a new catalyst, performed based on a thermal model with a model correction algorithm.
Figure 17:
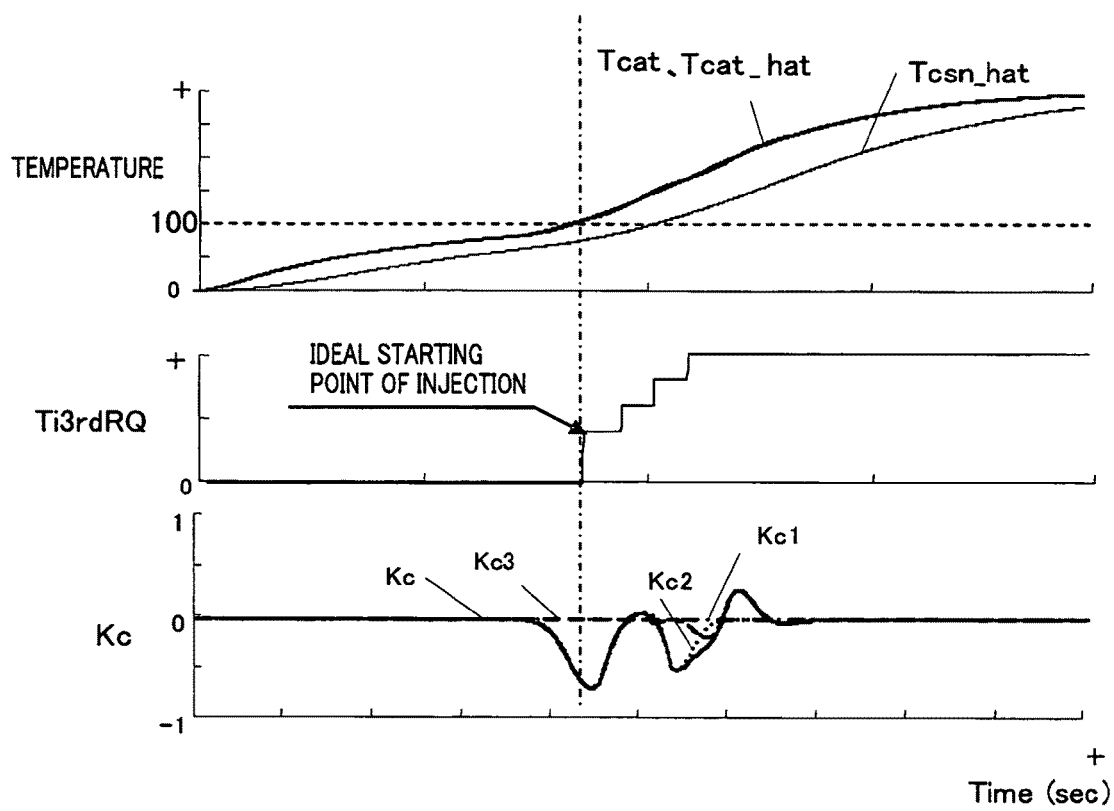
FIG. 17 illustrates a result of the expansion/exhaust stroke injection control, with a degraded catalyst, performed based on a thermal model with a model correction algorithm.

FIG. 16 shows a result of the expansion/exhaust stroke injection control performed based on a thermal model with a model correction algorithm for a new catalyst. FIG. 17 shows the same but for a degraded catalyst.

As is apparent from FIGS. 16 and 17, even if the catalyst has fallen into a degradation condition that is different from the preset condition of the thermal model, the model correction algorithm (VENUS) compensates for the nonlinear characteristic variations, thereby reducing the difference between the actual catalyst temperature Tcat and the estimated value Tcat_hat as much as possible. In the drawings, the Tcat line and Tcat_hat line are overlapped. Thus, the expansion/exhaust stroke injection can be performed at proper timing under any catalyst degradation conditions.

4. Application of the Invention to Battery Cooling System

The charging of a battery, such as one installed in an electric vehicle or hybrid electric vehicle (HEV) generally causes a chemical reaction that generates heat, so that rapid charging is liable to damage the battery by increasing its temperature to an abnormally high level.

Figure 18:
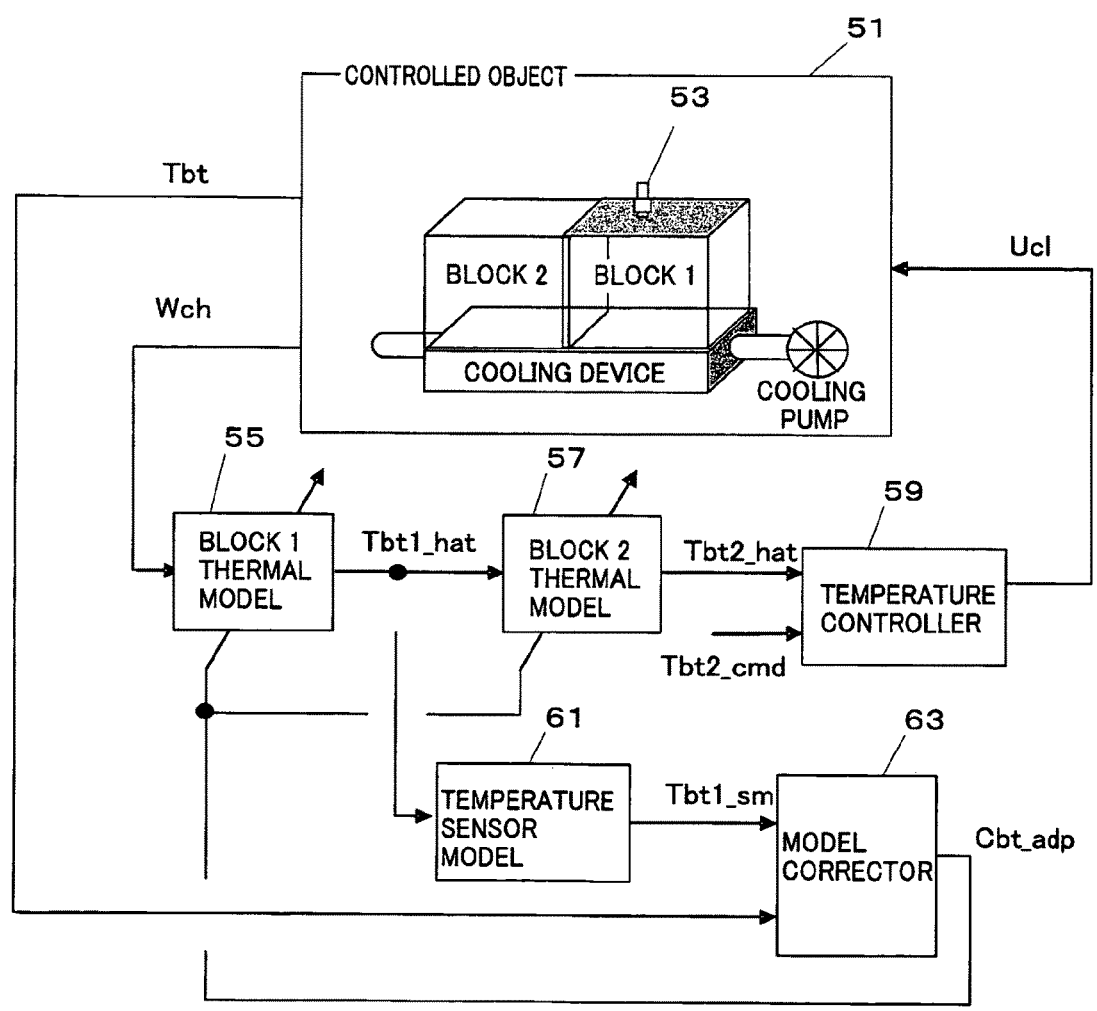
FIG. 18 is a block diagram of an embodiment of the invention.

To prevent this, a temperature sensor 53 mounted on a battery as shown in FIG. 18 produces an output Tbt_act that is referenced to control a cooling device with an input Ucl so that the Tbt_act is limited to a target temperature Tbt_cmd or lower. However, a temperature sensor fabricated to withstand the vibration and other harsh environmental conditions encountered during use in connection with an on-board battery does not offer good response performance. The cooling control is therefore too slow at the time of rapid temperature increase and the battery is liable to be damaged as a result. This problem has been conventionally handled by lowering the charging speed.

Most batteries are divided into a number of blocks that are individually cooled to varying degrees by ambient air and a cooling device. Although this variation can be monitored by installing a temperature sensor in conjunction with each block so as to enable the blocks to be individually temperature-controlled, this solution would not only be expensive but also lower fuel efficiency by adding to the weight of the vehicle utilizing the battery.

Figure 19:
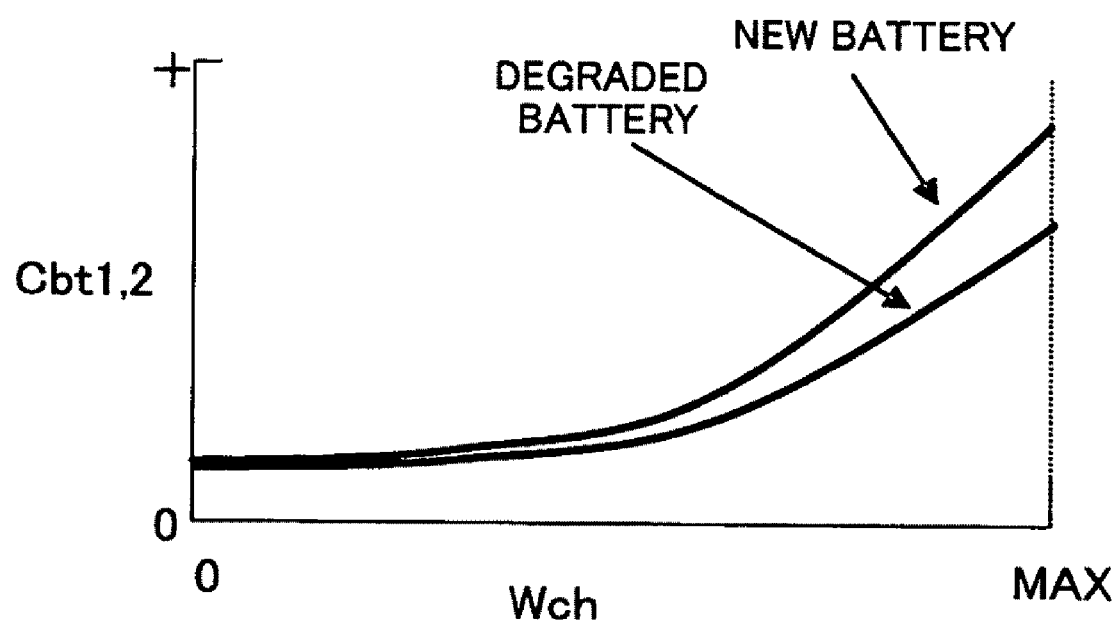
FIG. 19 illustrates the relationship between the charging power Wch of a battery and exothermic coefficients Cbt1, 2.

Furthermore, the exothermic coefficient Cbt1 of a thermal model, which will be described later, has nonlinear properties relative to the charging power Wch as shown in FIG. 19. In addition, since exothermic reaction of the battery is different depending on the degradation condition of the battery, Cbt1, 2 change differently as exemplified in FIG. 19.

Under this circumstance, a need has therefore been felt for a technique capable of compensating the response lag of the temperature sensor and the variation in exothermic characteristics according to the degradation conditions of a battery so as to control the temperature Tbt_act of the individual battery blocks to be not higher than the target temperature Tbt_cmd, without installing a large number of sensors and without overly limiting the charging speed.

The temperature control that meets this need can be realized by applying the aforementioned control technique to the temperature control system of the battery as shown FIG. 18.

The battery in FIG. 18 is divided into a block 1 and block 2 whose battery temperature is represented by Tbt1($k$) and Tbt2($k$), respectively. The thermal model of the individual battery blocks in FIG. 18 is represented by the following equations.

$$\frac{Tbt1(k) - Tbt1(k-1)}{\Delta T} = Abt1\left\{\begin{array}{c} Tbt1(k-1) - \\ TA(k-1) \end{array}\right\} + Bbt1\left\{\begin{array}{c} Tbt1(k-1) - \\ Tbt2(k-1) \end{array}\right\} + \\ Cbt1 Wch(k-1) + Dbt1\left\{\begin{array}{c} Tbt1(k-1) - \\ Tcl(k-1) \end{array}\right\} Ucl(k-1) \quad (4\text{-}1)$$

$$\frac{Tbt2(k) - Tbt2(k-1)}{\Delta T} = Abt2\left\{\begin{array}{c} Tbt2(k-1) - \\ TA(k-1) \end{array}\right\} + Bbt2\left\{\begin{array}{c} Tbt1(k-1) - \\ Tbt1(k-1) \end{array}\right\} + \\ Cbt2 Wch(k-1) + Dbt2\left\{\begin{array}{c} Tbt2(k-1) - \\ Tcl(k-1) \end{array}\right\} Ucl(k-1) \quad (4\text{-}2)$$

⇓

$$Tbt1(k) = (Abt1\Delta T + Bbt1\Delta T - 1)Tbt1(k-1) - \\ Bbt1\Delta T Tbt2(k-1) - Abt1\Delta T TA(k-1) + \\ Cbt1\Delta T Wch(k-1) + Dbt1\Delta T\left\{\begin{array}{c} Tbt1(k-1) - \\ Tcl(k-1) \end{array}\right\} Ucl(k-1) \quad (4\text{-}3)$$

$$Tbt2(k) = (Abt2\Delta T + Bbt2\Delta T - 1)Tbt2(k-1) - \\ Bbt2\Delta T Tbt1(k-1) - Abt2\Delta T TA(k-1) + \\ Cbt2\Delta T Wch(k-1) + Dbt2\Delta T\left\{\begin{array}{c} Tb2(k-1) - \\ Tcl(k-1) \end{array}\right\} Ucl(k-1) \quad (4\text{-}4)$$

where:

Abti, Bbti, Cbti, Dbti: thermal model parameters (i=1, 2: block number)

Ucl( ): Cooling device input voltage

TA( ): Ambient air temperature

Tcl( ): Coolant temperature

Wch: Amount of charging power $\Delta T$: Sampling cycle (control cycle)

The temperature sensor 53 is mounted on the block 1 and feeds a sensor output Tbt. The thermal model 55 of the battery block 1 and thermal model 57 of the battery block 2 calculate the estimated temperature values Tbt1_hat and Tbt2_hat of the block 1 and block 2, respectively. The control algorithm for controlling the actual temperature Tbt2_act of the block 2 to be the target value Tbk_cmd or lower is given by the equations below.

Thermal model 55 of block 1:

$$Tbt1\_hat(k) = (Abt1\Delta T + Bbt1\Delta T - 1)Tbt1\_hat(k-1) - \\ Bbt1\Delta T Tbt2\_hat(k-1) - Abt1\Delta T TA(k-1) + Cbt\_\\ adp(k-1)\Delta T Wch(k-1) + Dbt1\Delta T\{Tbt1\_hat(k-1) - \\ Tcl(k-1)\}Ucl(k-1) \quad (4\text{-}5)$$

where Cbt_adp(k−1) is a model correction coefficient obtained by a model corrector 63 and is referred to as a corrected heat-production coefficient.

Temperature sensor model 61:

$$Tbt1\_sm(k) = (1+Ksm')Tbt1\_sm(k-1) - Ksm'Tbt1\_hat(k) \quad (4\text{-}6)$$

Tbt1_sm( ): estimated output value of the temperature sensor

Ksm': sensor time-lag coefficient (−1<Ksm'<0)

Model corrector (VENUS) 63:

$$Em(k) = Tbt1\_sm(k) - Tbt1(k) \qquad (4\text{-}7)$$

Figure 4:
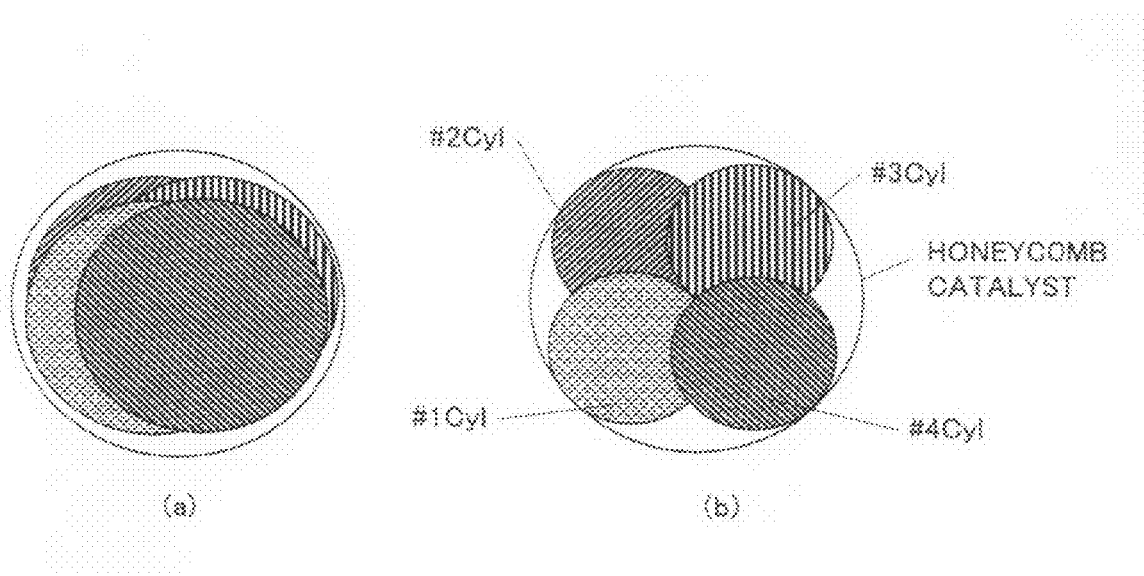
FIGS. 4A and 4B illustrate biased exhaust gases flowing into a honeycomb catalyst.

$Wi(k)$ is obtained by retrieving Fig.4-4 using $Wch(k)(i = 0 \text{ to } 2)$ (4-8)

$$Ewi(k) = Wi(k)Em(k) \qquad (4\text{-}9)$$

$$\sigma^* i(k) = Ewi(k) + S^* Ewi(k-1) \qquad (4\text{-}10)$$

$$Kc\_rch\_i(k) = Krch^* \sigma^* i(k) \qquad (4\text{-}11)$$

$$Kc\_adp\_i(k) = Kadp^* \sum_{j=0}^{k} \sigma^* i(j) \qquad (4\text{-}12)$$

$$Kci(k) = Kc\_rch\_i(k) + Kc\_adp\_i(k) \qquad (4\text{-}13)$$

$$Kc(k) = 1 + \sum_{i=0}^{2} Kci(k) \qquad (4\text{-}14)$$

$Cbt\_bs(k)$ is obtained by retrieving Fig.4-3 using $Wch(k)$ (4-15)

$$Cbt\_adp(k) = Kc(k)Cbt\_bs(k) \qquad (4\text{-}16)$$

$Krch^* Kadp^*$ : feedback gains
$S^*$ : Switching Function setting Parameter($-1 < S^* < 0$)
$Tbt1$ : temperature sensor output $\begin{pmatrix} \text{detected temperature} \\ \text{of block 1} \end{pmatrix}$ Thermal model 57 of block 2:

$$Tbt2\_hat(k) = (Abt2\Delta T + Bbt2\Delta T - 1)Tbt2\_hat(k-1) - \\ Bbt2\Delta T Tbt1\_hat(k-1) - Abt2\Delta T TA(k-1) + Cbt\_\\ adp(k-1)\Delta TWch(k-1) + Dbt1\Delta T\{Tbt2\_hat(k-1) - \\ Tcl(k-1)\}Ucl(k-1) \qquad (4\text{-}17)$$

Tbt2_hat( ): estimated temperature value of block 2

Temperature controller 59:

$$Tbt1\_cmd\_f(k) = -R'Tbt\_cmd\_f(k-1) + (1+R')Tbt\_cmd(k) \qquad (4\text{-}18)$$

$$Etbt(k) = Tbt2\_hat(k) - Tbt\_cmd\_f(k) \qquad (4\text{-}19)$$

$$\sigma'(k) = Etdt(k) + S'Etbt(k-1) \qquad (4\text{-}20)$$

$$Urch'(k) = -Krch'\sigma'(k) \qquad (4\text{-}21)$$

$$Uadp'(k) = -Kadp' \sum_{i=0}^{k} \sigma'(i) \qquad (4\text{-}22)$$

$$Usl'(k) = Urch'(k) + Uadp'(k) \qquad (4\text{-}23)$$

$$Ucl = \begin{cases} 0 & (Usl'(k) > 0) \\ |Usl'(k)| & (Usl'(k) \le 0) \end{cases} \qquad (4\text{-}24)$$

$Krch' Kadp$ : feedback gains
$S'$ : Switching Function setting Parameter
$R'$ : filter coefficient of desired value $\ast -1 < R' < S' < 0$ In order to compensate degradation and variations of the exothermic coefficients Cbt1, 2 in FIG. 19, the battery temperature control shown in FIG. 18 causes the model corrector 63 to correct the exothermic coefficient Cbt_adp of the thermal model expressed by Equations 4-5 and 4-17. The model corrector 63 does not correct the constant of the exothermic coefficient for each control cycle, but corrects the nonlinear properties of the exothermic coefficients Cbt1, 2 relative to the charging power Wch shown in FIG. 19 to nonlinear properties (not only constant multiplication or offset) for the purpose of adjusting the characteristics of the exothermic coefficient Cbt_adp to the current battery conditions.

Figure 20:
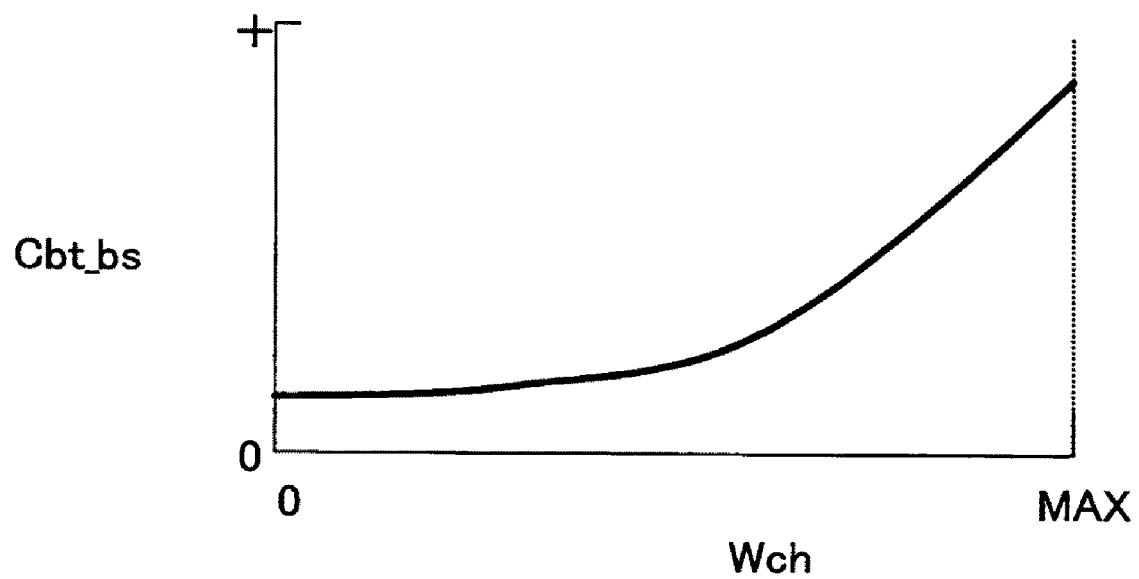
FIG. 20 illustrates the relationship between the charging power Wch of a battery and the reference exothermic coefficient Cbt_bs.
Figure 21:
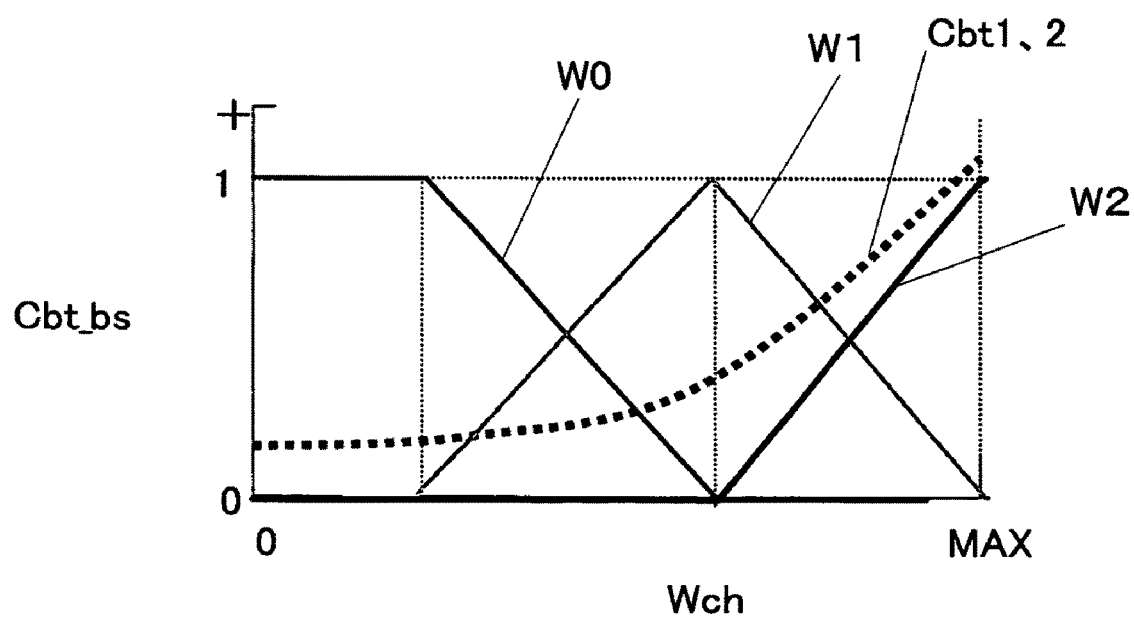
FIG. 21 illustrates a correlation of correction weighting functions Wi.
Figure 22:
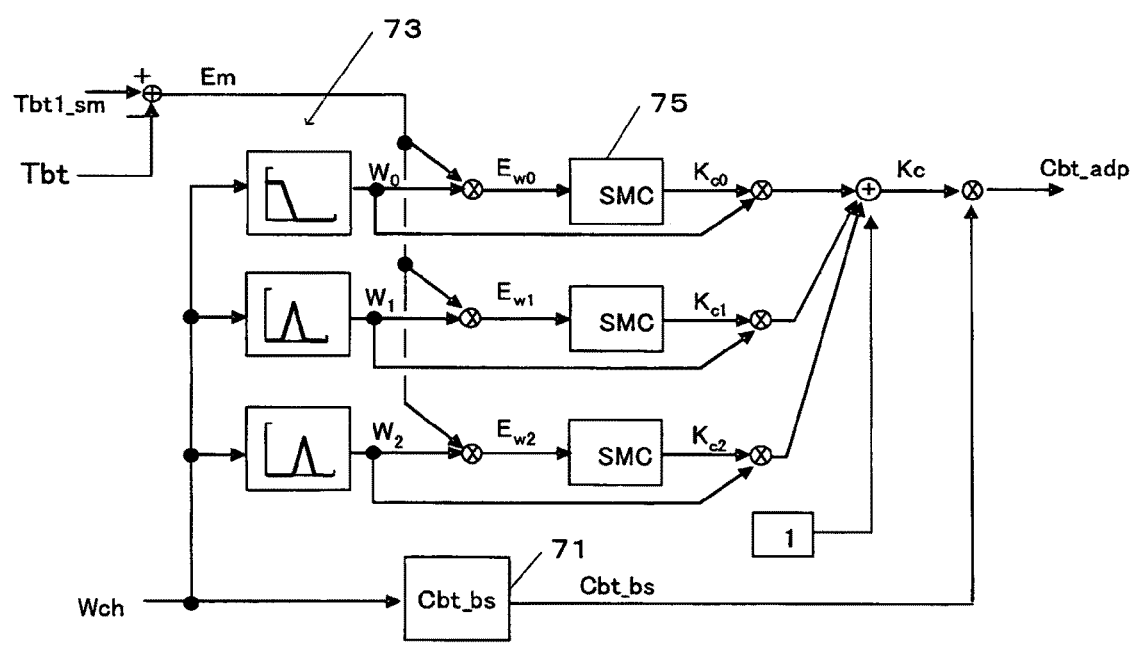
FIG. 22 is a block diagram of a model corrector 63.

FIG. 22 is a block diagram of the model corrector 63 making the adjustment through the aforementioned control technique (VENUS). In block 71, a reference exothermic coefficient Cbt_bs corresponding to the charging power is obtained by referring to the map shown in FIG. 20. With reference to the map in FIG. 21, correction weighting function sections 73 obtain correction weighting functions $W_0$, $W_1$, $W_2$ that closely intersect with each other in a region where the exothermic coefficient characteristics vary and whose sum is equal to the maximum value of each function.

A local correction coefficient Kci corresponding to the height of the correction weighting function Wi is determined. The determination of the local correction coefficient Kci is made through a sliding mode controller (SMC) 75 so that the weighting error Ewi obtained by multiplying the model error Em, which is the deviation between the sensor output Tbt and the sensor model output Tbt1_sm, by Wi is zero. In addition to the sliding mode control, a PID control, an optimal control, a backstepping control, a model predictive control and other controls can be used. Among these controls, the sliding mode control, backstepping control and model predictive control that can designate the convergence behavior of the deviation are preferred.

With the Kci, a model correction coefficient Kc is calculated as shown by Equation 4-14, and then a correction coefficient Cbt_adp is obtained by multiplying Kc by the reference exothermic coefficient Cbt_bs (Equation 4-16).

Although the battery temperature can be controlled by adjusting the input Ucl to the cooling device, the sliding mode control is applied in this embodiment. Instead of the sliding mode control, the above mentioned control technologies are also feasible.

FIGS. 23 to 26 show temperature Tbt2 of a new battery or a degraded battery controlled without an adaptive correction (Kc=1) or with the adaptive correction (Kc=1).

Figure 23:
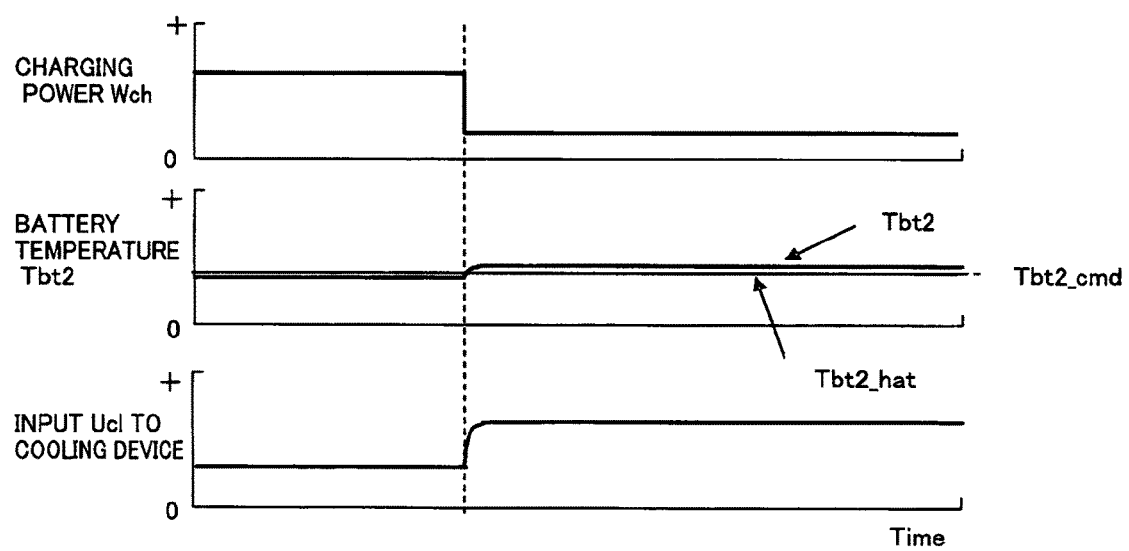
FIG. 23 illustrates the resultant temperature of a new battery controlled without an adaptive correction.

FIG. 23 shows the resultant temperature of the new battery without adaptive control (Kc=1). Since the error between the preset Cbt_bs and actual exothermic coefficient is caused only by variations in individual batteries, the error between the actual temperature Tbt2 and the estimated value Tbt2_hat obtained from the model is small, and therefore the steady-state deviation between Tbt2 and the target value Tbt_cmd is minute.

Figure 24:
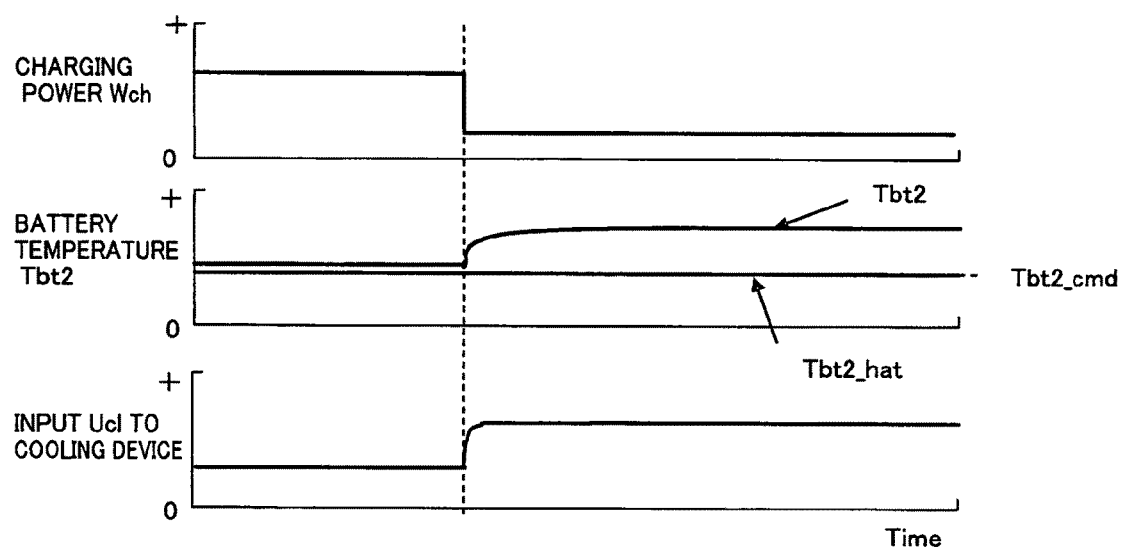
FIG. 24 illustrates the resultant temperature of a degraded battery controlled without an adaptive correction.

FIG. 24 shows the resultant temperature of the degraded battery without the adaptive control (Kc=1). Since the error between Tbt2 and Tbt2_hat is greater than that of the new battery, the steady-state deviation between Tbt2 and the target value Tbt_cmd becomes very large. The temperature Tbt2 being excessively higher than the target temperature value accelerates battery degradation.

Figure 25:
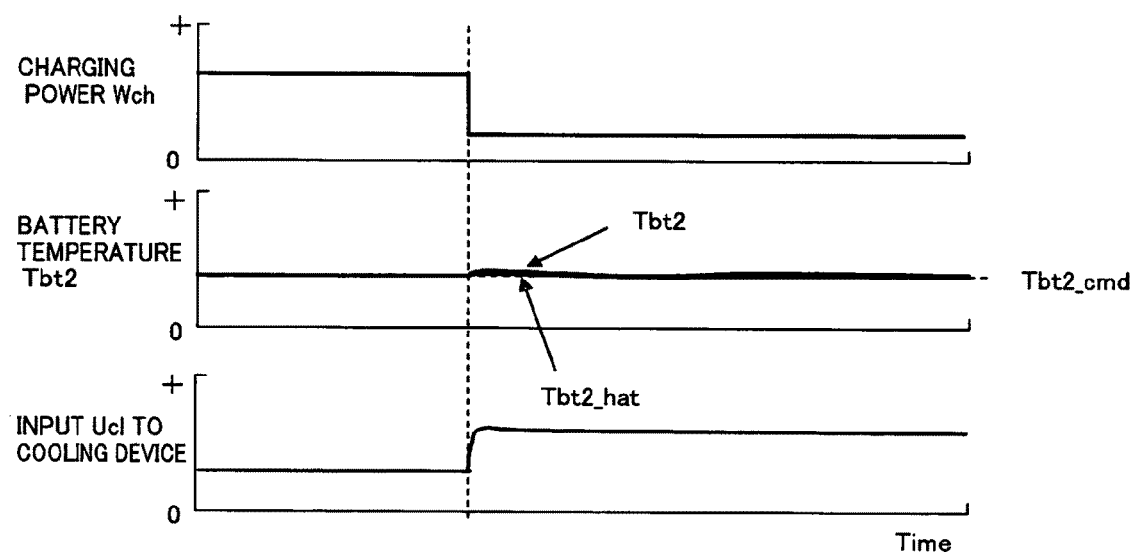
FIG. 25 illustrates the resultant temperature of the new battery controlled with an adaptive control.
Figure 26:
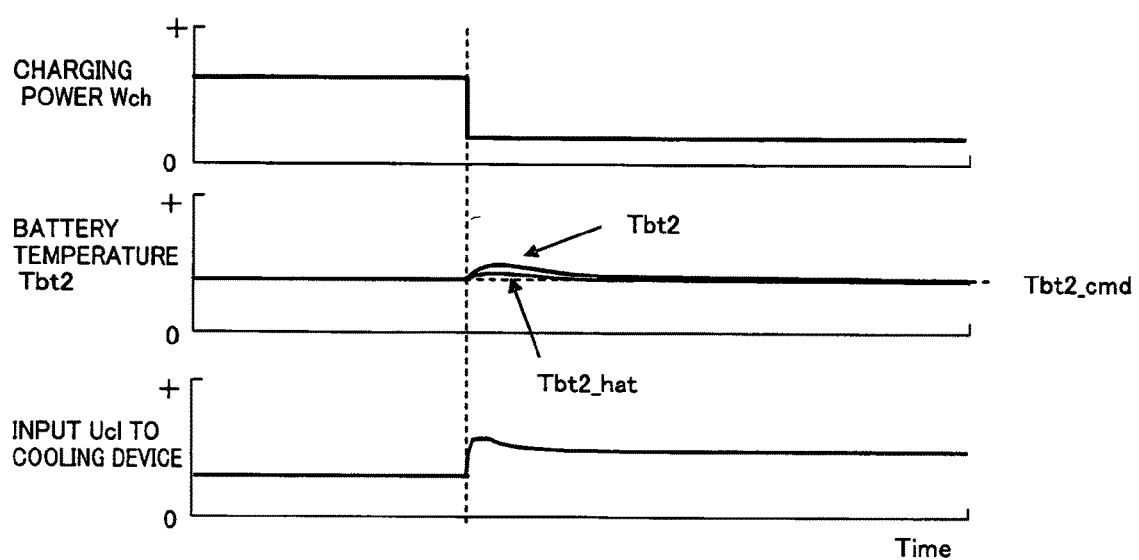
FIG. 26 illustrates the resultant temperature of the degraded battery controlled with an adaptive correction.

FIG. 25 shows the resultant temperature of the new battery with the adaptive control. FIG. 26 shows resultant temperature of the degraded battery with the adaptive control. In both cases, the model corrector 63 appropriately corrects the characteristics of the exothermic coefficient relative to the charging power Wch, and the exothermic coefficient Cbt_adp is determined based on the corrected characteristics. This restricts the error between Tbt2 and Tbt2_hat to a minute level even upon change of Wch and prevents the steady-state deviation in a steady state. Accordingly, Tbt2 can be accurately controlled to be Tbt_cmd regardless of the battery's conditions, thereby preventing abnormal degradation of the battery. In addition, prevention measures against the abnormal degradation, including deceleration of charging speed, are unnecessary.

Figure 27:
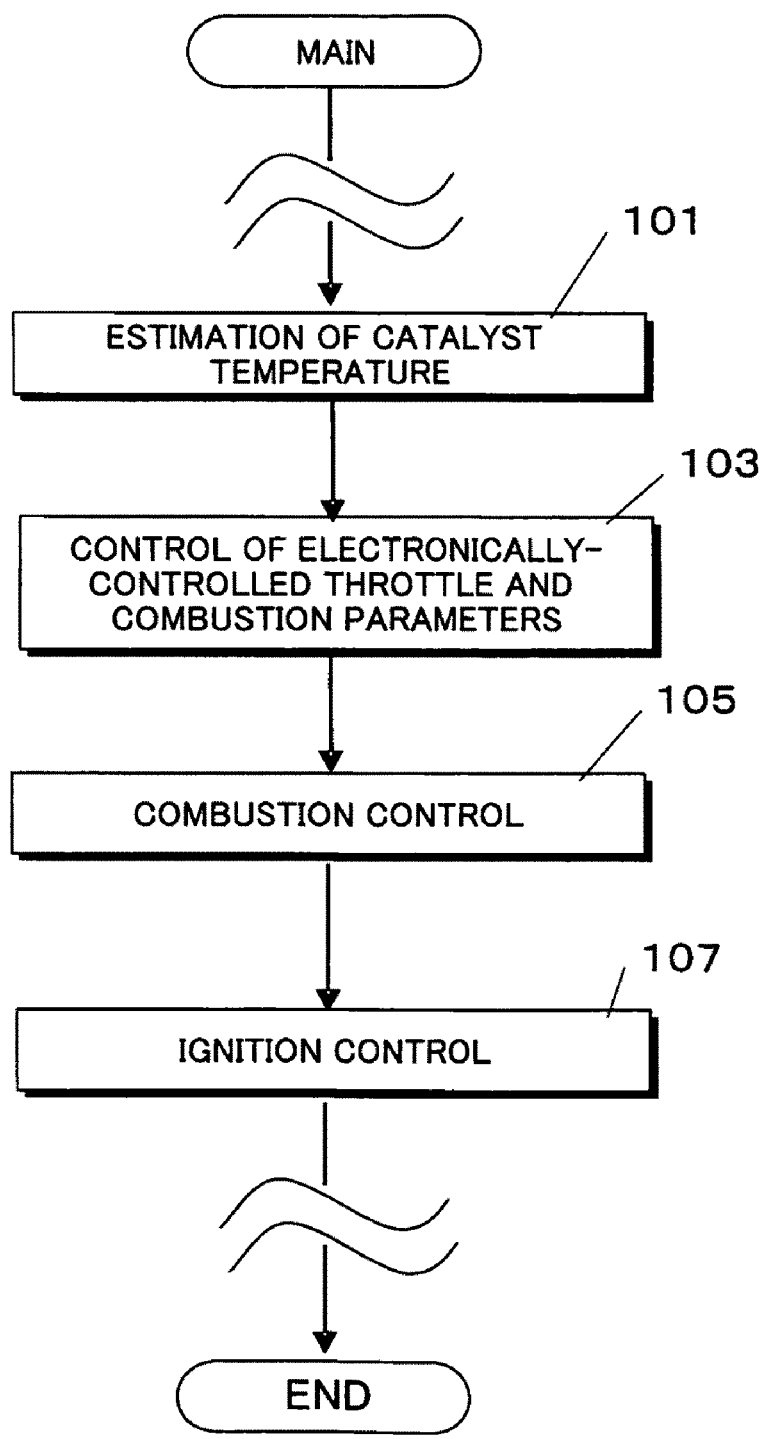
FIG. 27 is a flow chart showing a main flow of an embodiment.

A main flow of the electronic control over engines pertinent to the present invention is shown in FIG. 27. With the above-described technique, the main flow is performed, including estimation of the catalyst temperature (101), control of an electronically-controlled throttle and combustion parameters (103), combustion control of cylinders (105) and ignition control (107). Processing flows of each of these steps are indicated in the following flow charts.

Figure 28:
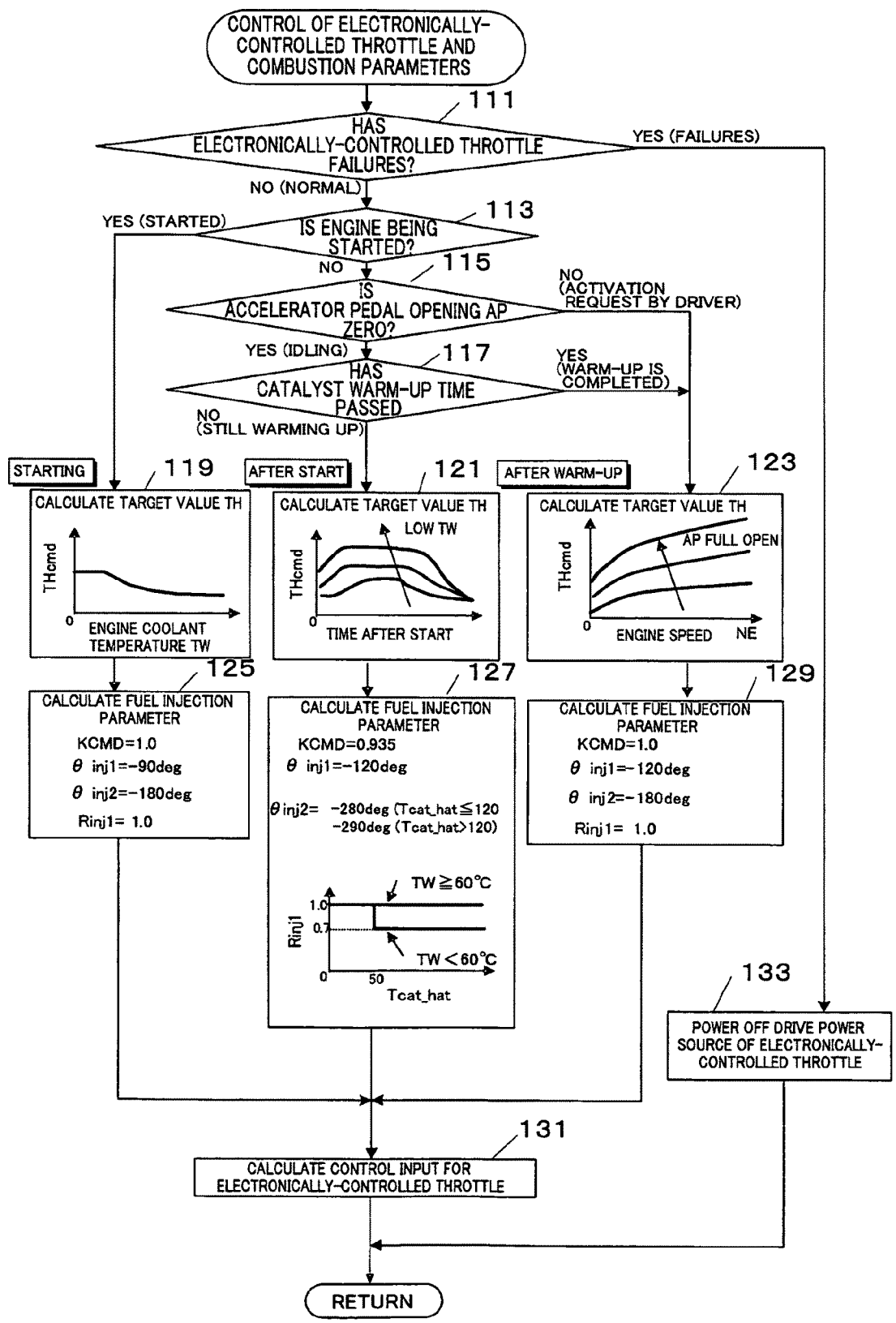
FIG. 28 is a flow chart showing a process of calculating control inputs for an electronically-controlled throttle.

FIG. 28 is a flow chart illustrating processing steps of controlling the electronically-controlled throttle and combustion parameters (103) in the main flow. In this embodiment, this flow is executed every five mm/sec in synchronization with a timer. First, the electronically-controlled throttle is determined whether it has failures or not (111). If the throttle has failures, its driving power source is turned off and the process is terminated. If the throttle is in a normal condition, it is determined whether an engine is being newly started or not (113). If the engine is being newly started, the process goes to step 119, while going to step 115 if the engine has been already started.

In step 115, it is determined whether the accelerator pedal is fully released. If the accelerator pedal is fully released, which means the engine is at an idle, the process goes to step 117 where it is determined whether the warm-up time for the catalyst has been completed. If the catalyst is still in the warm-up time, the process goes to step 121, while going to step 123 if the warm-up time has already been completed.

Step 119 is a step where a target value THcmd of the throttle opening degree to start up the engine is calculated. Step 121 is a step where a target value THcmd of the throttle opening degree during the warm-up of the catalyst is calculated. Step 123 is a step where a target value THcmd of the throttle opening degree after the warm-up of the catalyst is calculated.

From the chart in step 119 of FIG. 28, the target value THcmd of the throttle opening degree to start up the engine is obtained relative to the engine coolant temperature TW. Since a lower engine coolant temperature causes more friction, THcmd is set to a large value accordingly. From the chart in step 121, the target value THcmd of the throttle opening degree during the warm-up after the start-up of the engine is obtained relative to the elapsed time after the engine starts and engine coolant temperature. Since a lower engine coolant temperature requires higher warm-up performance for the catalyst, THcmd is set to a large value accordingly. From the chart in step 123, the target value THcmd of the throttle opening degree after completion of the warm-up operation is obtained relative to the engine speed NE and accelerator pedal opening degree AP. The more drivers require driving force, in other words, the greater AP is, the larger THcmd is set.

Step 125 is a step where a fuel injection parameter to start an engine is calculated. FIG. 28 defines: the equivalent ratio KCMD=1; the first injection timing θinj1 is −90 degrees (90 degrees from the top intake), the second injection timing θinj2 is −180 degrees (180 degrees from the top intake); and the first injection ratio Rinj1 of the first injection amount to the total injection amount of the first injection and second injection is 1.0, in other words, the second injection is not performed.

Step 127 is a step where a fuel injection parameter during the warm-up operation is calculated. FIG. 28 defines: KCMD=0.935; θinj1=−120 degrees; and θinj2 is set to −280 degrees or −290 degrees depending on Tcat_hat. The first injection ratio Rinj1 is switched between 1.0 and 0.7, as shown in the chart in step 127, relative to the estimated temperature value Tcat_hat of the catalyst and engine coolant temperature. When Rinj1 is 0.7, the second injection ratio Rinj2 is 0.3, which means 30% of the fuel is discharged from an injector at the second injection. As shown in this chart, the split injection is executed when the engine coolant temperature TW is low and the rapid warm-up needs to be enhanced. In order to realize the weak stratification, θinj1 and θinj2 are set to a value as described before. The purpose of changing θinj2 to −290 degrees is to slightly increase the HC, which was reduced due to the activation of the catalyst started with the increase of Tcat_hat, and to send the HC in order to increase the catalyst temperature.

It is possible to plot the elapsed time after start-up of the engine on the horizontal axis of the chart shown in step 127. This allows the value of Rinj1 to be switched according to the elapsed time after start-up of the engine.

The fuel injection parameter after the warm-up is set to the value indicated in step 129 of FIG. 28.

With thus obtained fuel injection parameter, a control input to the electronically-controlled throttle is calculated (131). This calculation can be made using a PID control, sliding mode control, model predictive control and other control techniques.

Figure 29:
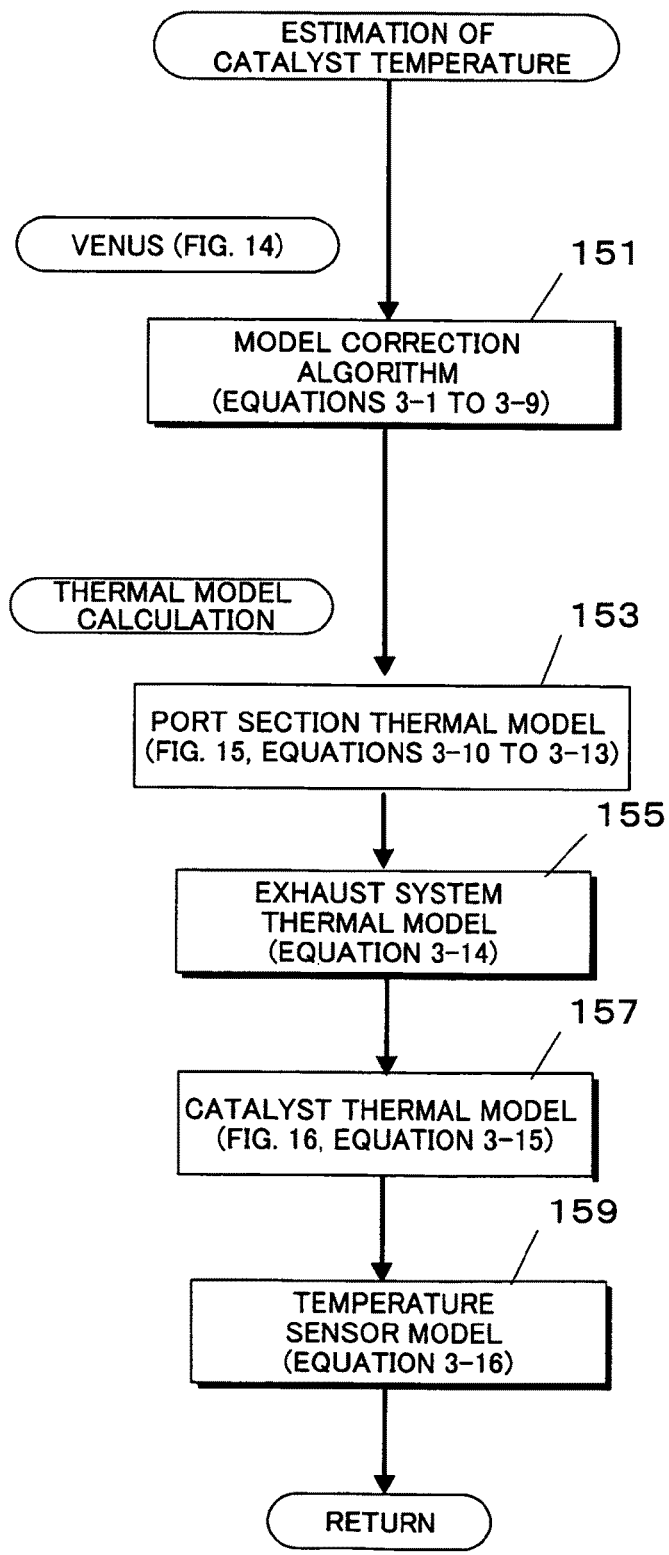
FIG. 29 is a flow chart showing a process of estimating temperature of a catalyst.

FIG. 29 illustrates a process flow for estimating catalyst temperature. This process is performed every 5 mm/sec, for example, in synchronization with a timer. In step 151, the model correction algorithm (VENUS) shown in FIG. 13 and by Equations 3-1 and 3-9 is executed. In step 153, the thermal model shown in FIG. 14 and by Equations 3-10 to 3-13 is calculated. In step 155, the exhaust system thermal model shown by Equation 3-14 is calculated. In step 157, the catalyst thermal model shown in FIG. 15 and by Equation 3-15 is calculated. In step 159, the temperature sensor model shown by Equation 3-16 is calculated.

Figure 30:
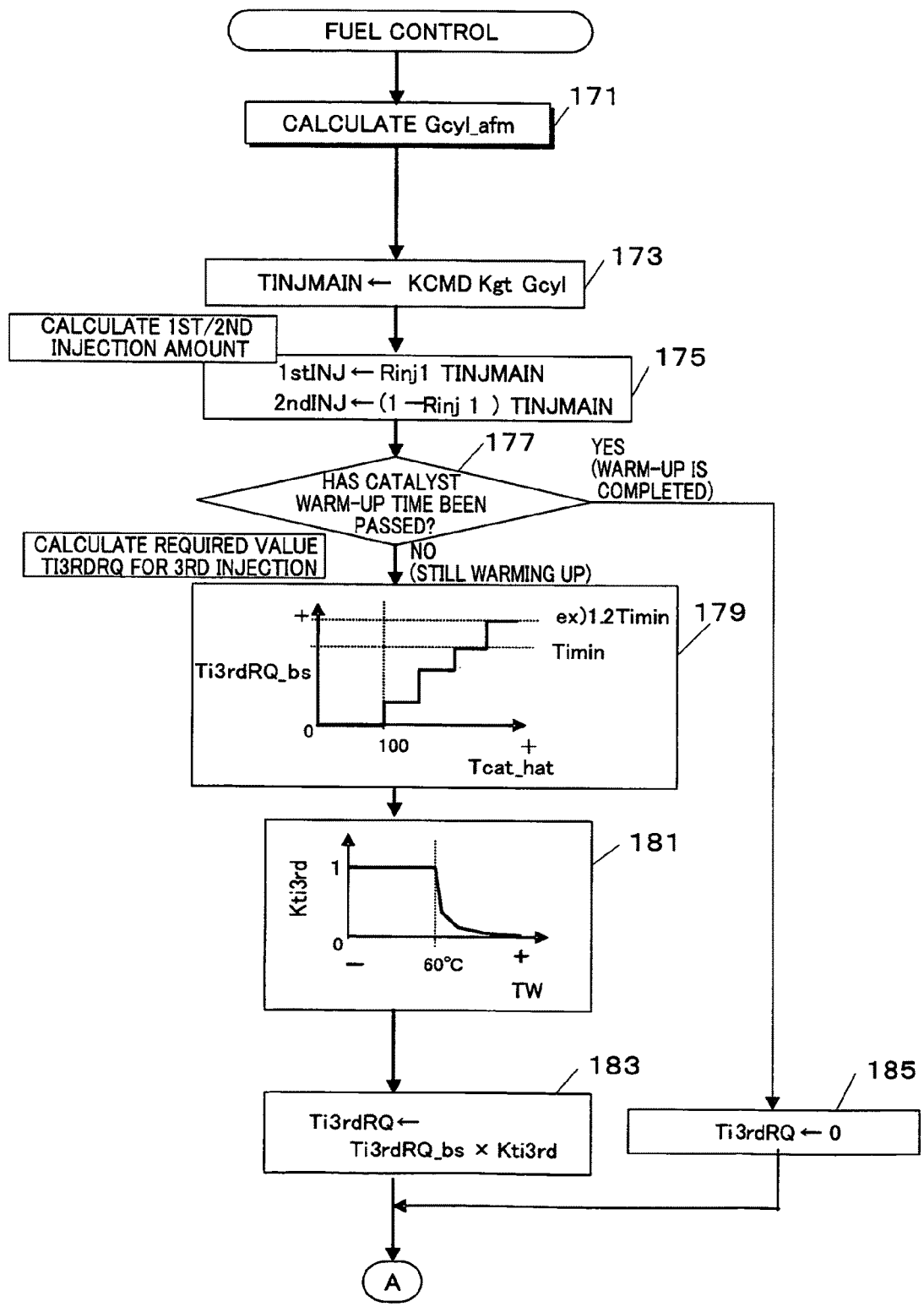
FIG. 30 is a flow chart showing a process of fuel control.
Figure 31:
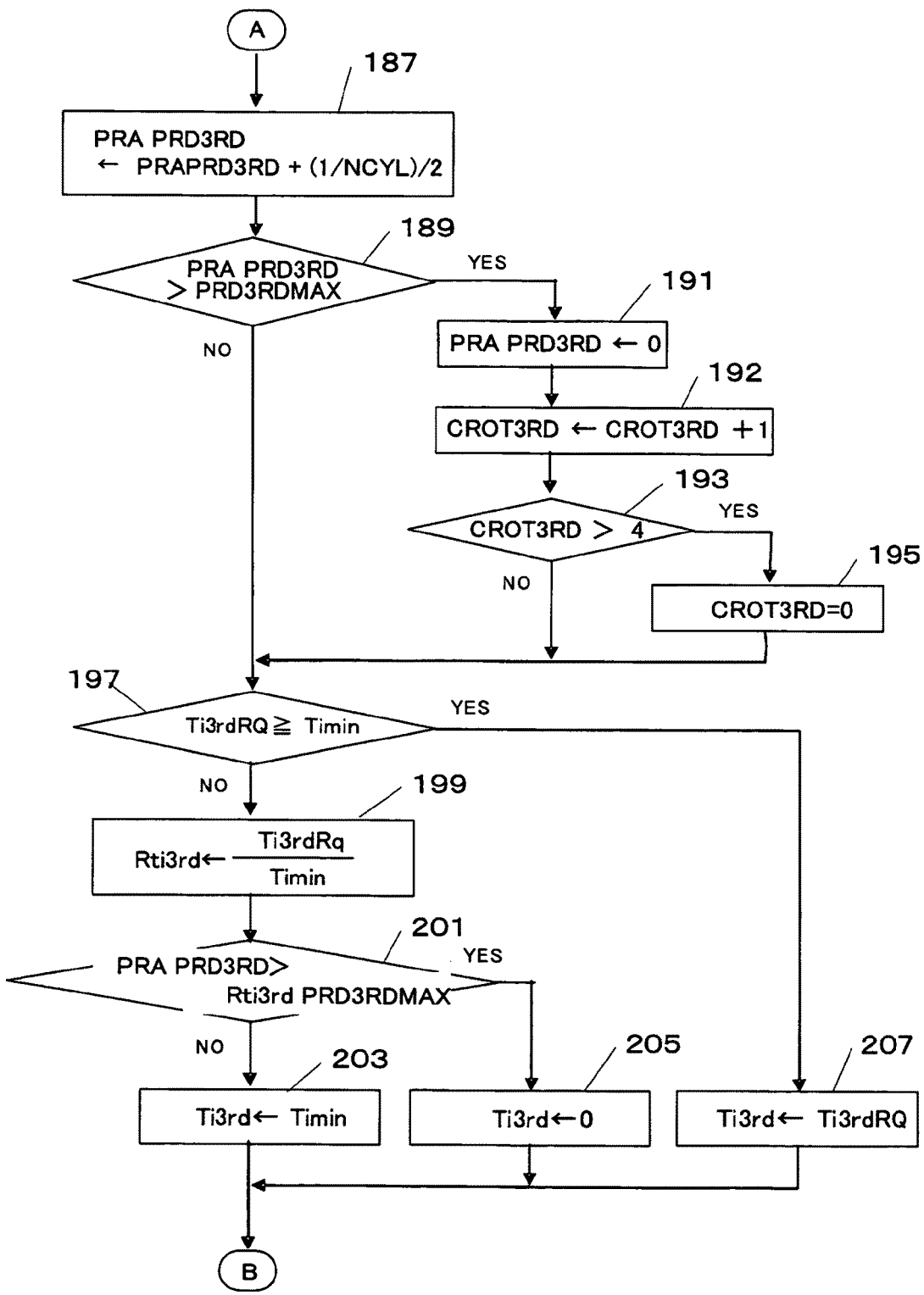
FIG. 31 is a flow chart showing a process subsequent to FIG. 30.
Figure 32:
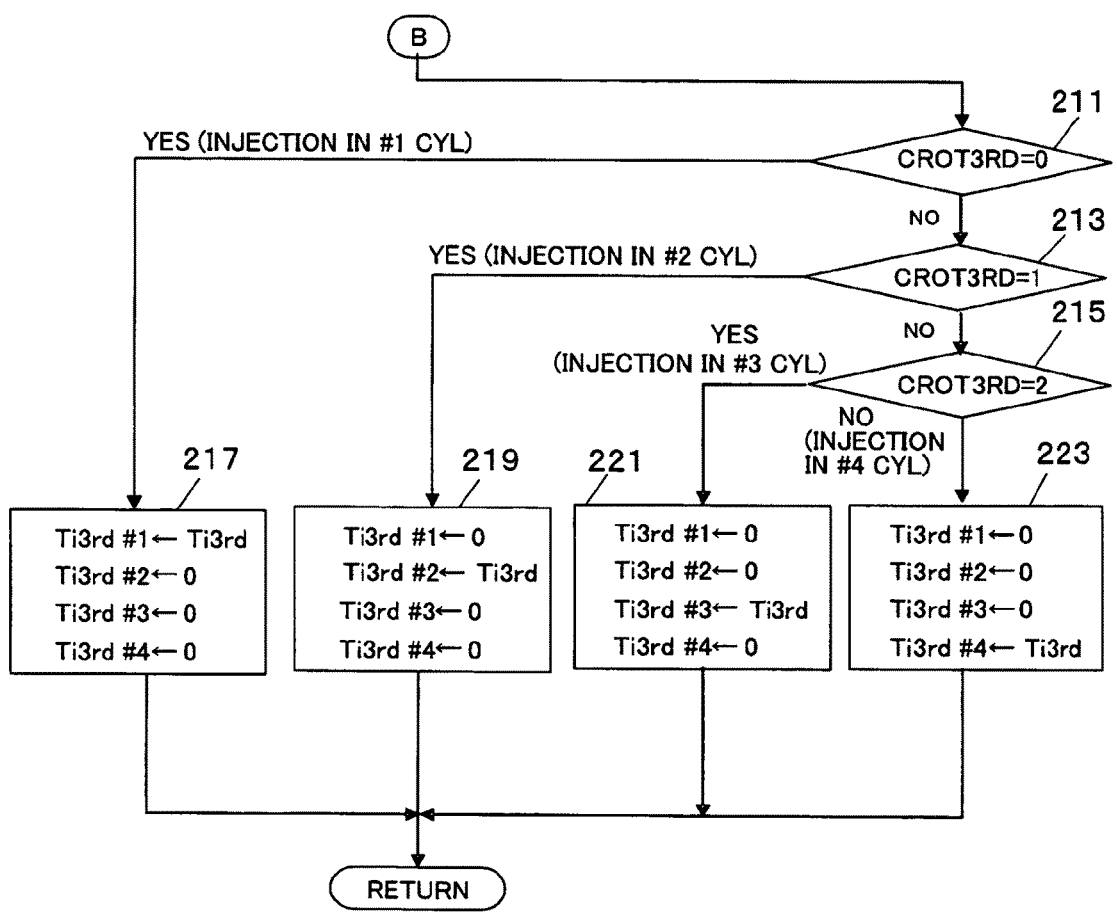
FIG. 32 is a flow chart showing rotation control of cylinders.

Referring to FIGS. 30 to 32, an embodiment of the fuel injection control will be described. First, in step 171, an amount of intake air Gcyl_afm is obtained. The output of an air flow meter (AFM) 15 installed at an air intake pipe 13 (FIG. 10) of an engine is sampled per a crank pulse and then calculated to obtain an average value Gin_afm(g/sec) in a TDC (Top Dead Center of pistons) section. The amount of intake air Gcyl_afm can be obtained by the following equation.

$$Gcyl\_afm(g/cyl)=60 \times Gin\_afm/(2 \times NE)$$

Next, the amount of the fuel in main injection TINJMAIN is calculated by the equation in step 173. In this equation, KCMD represents a target value of the equivalent ratio, and Kgt represents a conversion factor used to obtain a fuel injection amount from the amount of intake air Gcyl. The conversion factor Kgt, which differs depending on the injector, can be obtained by retrieving it in the nonlinear table and by correlating it with Gcyl.

Thus obtained fuel amount TINJMAIN is split to be injected two times in step 175 as described by referring to FIG. 2. The first injection 1stINJ can be obtained by multiplying TINJMAIN by the first injection ratio Rinj1 described in conjunction with steps 125, 127 and 129 in FIG. 28. The second injection 2ndINJ can be obtained by multiplying TINJMAIN by (1−Rinj1).

It is determined in step 177 whether the catalyst is in the warm-up time. If the catalyst is in the warm-up time, the process goes to step 179 where a base value Ti3rdRQ_bs of the required amount Ti3rdRQ required for the expansion/exhaust stroke injection 3rdINJ is calculated. This base value is obtained relative to the estimated temperature value Tcat_hat of the catalyst from the map shown in step 179. The upper limit of Ti3rdRQ corresponds to the minimum fuel injection amount (injection time) Timin of the injector however, can be set to a value greater than the minimum fuel injection amount (injection time) Timin, for example, 1.2 Timin (see "ex") 1.2 "Timin" in the map).

Subsequently, in step 181, Kti3rd is obtained relative to the engine coolant temperature TW by retrieving it from the map as shown in FIG. 30. Kti3rd is a coefficient used to reduce the expansion/exhaust stroke injection for a restarted engine that has once stopped after completion of warm-up operation and is still warm. When the engine coolant temperature is 60° C. or higher, Kti3rd takes a value less than 1.

In step 183, a required value Ti3rdRQ is obtained by multiplying the base value Ti3rdRQ_bs of the required value Ti3rdRQ required for the expansion/exhaust stroke injection 3rdINJ by Kti3rd. If the warm-up time is completed in step 177, the required value Ti3rdRQ is set to zero (185), and then the process goes to a flow in FIG. 31.

The flow in FIG. 31 is executed in synchronization with TDC. In step 187, a counter (timer) PRAPROD3RD, which takes a count after every execution of the flow, in other words, counts the number of combustion cycles at every TDC, is updated. When the number of cylinders is represented by NCYL, (1/NCYL)/2 is counted per TDC since one cycle includes two rotations.

In step 189, a comparison is made between the cycle period PRD3RDMAX described in conjunction with Equation 2-2 and FIG. 4, and a count value. If the count value is equal to the value of the cycle period or lower, the process goes to step 197. The cycle period PRD3RDMAX is, for example, set at eight, and the counter PRAPROD3RD is reset every time the count value exceeds eight (191), while a cylinder rotation counter CROT3RD is incremented by only one (192). In the case of a four-cylinder engine, the CROT3RD is reset to zero (195) every time it counts over four (193).

In step 197, it is determined whether the required amount Ti3rdRQ for the expansion/exhaust stroke injection obtained in step 183 is equal to or more than the minimum fuel injection amount (injection time) Timin of the injector. If Yes, the required amount, which can be injected by an injector without adjustment, is set as an injection amount Ti3rd for intermittent injection (207). If No, the injection ratio Rti3rd, described in conjunction with Equation 2-1, of the fuel to be intermittently injected in a cycle period is obtained (199). If the value of the cycle counter PRAPROD3RD is over the value obtained by multiplying the cycle period PRD3RDMAX by the ratio Rti3rd (201), this means that the expansion/exhaust stroke injection in the cycle period has been already completed and therefore the injection amount Ti3rd for the intermittent injection is set to zero (205). If the value of the cycle counter PRAPROD3RD is equal to or less than the value obtained by multiplying the cycle period PRD3RDMAX by the ratio Rti3rd (201), the minimum fuel injection amount (injection time) Timin of the injector is set to the injection amount Ti3rd for the intermittent injection (203).

Next, the process goes to the flow pertinent to the cylinder rotation in FIG. 32. When the rotation counter CROT3RD indicates 0 (211), the intermittent injection is performed in a first cylinder (217). When the counter CROT3RD indicates 1 (213), the intermittent injection is performed in a second cylinder. When the counter CROT3RD indicates 2 (215), the intermittent injection is performed in a third cylinder. When the counter CROT3RD indicates neither 0, 1 nor 2, that is, indicates 3 (215), the intermittent injection is performed in a fourth cylinder (223). In this example, the intermittent injection is performed by rotating cylinders of a four-cylinder engine.

The order of the cylinder rotation is not limited to the above-described rotation, but can be set up differently to meet various requirements.

Having described the present invention by referring to specific embodiments, it is to be understood that the invention is not limited to the embodiments thereof.

What is claimed is:

1. An electronic control system that controls the temperature of a plant and is provided with a temperature sensor producing outputs indicative of the plant temperature, comprising:
   means for calculating an estimated value of the temperature of said plant using a correlation model between a first parameter regarding said plant and a second parameter regarding a plant model, said plant model being constructed to calculate said estimated temperature value;
   plant temperature control means for controlling the temperature of said plant based on said calculated estimated temperature value of the plant;
   means for calculating correction coefficients based on the output of said temperature sensor and said calculated estimated temperature value of the plant, said correction coefficients adjusting the height of a plurality of functions, and said plurality of functions being defined in a range of a plurality of the first parameters for said correlation model; and
   model correcting means for correcting said correlation model by said plurality of functions and said correction coefficients.

2. The electronic control system according to claim 1, further comprising
   a temperature sensor model constructed to calculate an estimated output value of said temperature sensor with an input of said estimated temperature value, wherein
   said correction coefficients that adjust the height of the plurality of functions are set so as to minimize the error between said output from the temperature sensor and said calculated estimated output value of the temperature sensor.

3. The electronic control system according to claim 1, wherein
   said correction coefficients are calculated according to a response-specifying control algorithm.

4. The electronic control system according to claim 1, wherein
   said plurality of functions are set so as to intersect with each other in the range of first parameter whose rate of change is higher than that of the second parameter.

5. The electronic control system according to claim 1, wherein
   said plant is an exhaust system of an internal combustion engine.

6. The electronic control system according to claim 5, wherein
   said first parameter is a temperature parameter of an down-stream-treatment device installed in the exhaust system and said second parameter is a parameter indicating the exothermic state of the down-stream-treatment device.

7. The electronic control system according to claim 1, wherein said plant is a rechargeable battery.

8. The electronic control system according to claim 7, wherein
   said first parameter is a parameter indicating the amount of charge to the battery, and said second parameter is a parameter indicating the exothermic state of the battery.

9. A computer implemented method of controlling the temperature of a plant provided with a temperature sensor producing outputs indicative of the plant temperature, comprising:
   calculating an estimated value of the temperature of said plant using a correlation model between a first parameter regarding said plant and a second parameter regarding a plant model, said plant model being constructed to calculate said estimated temperature value;
   controlling the temperature of said plant based on said calculated estimated temperature value of the plant;
   calculating correction coefficients based on the output of said temperature sensor and said calculated estimated temperature value of the plant, said correction coefficients adjusting the height of a plurality of functions, and said plurality of functions being defined in a range of a plurality of the first parameters for said correlation model; and
   correcting said correlation model by said plurality of functions and said correction coefficients.

10. The method according to claim 9, further comprising:
    providing a temperature sensor model for calculating an estimated output value of said temperature sensor with an input of said estimated temperature value; and
    setting said correction coefficients that adjust the height of the plurality of functions to minimize the error between said output from the temperature sensor and said calculated estimated output value of the temperature sensor.

11. The method according to claim 9, wherein said correction coefficients are calculated according to a response-specifying control algorithm.

12. The method according to claim 9, wherein said plurality of functions are set to intersect with each other in the range of first parameter whose rate of change is higher than that of the second parameter.

13. The method according to claim 9, wherein said plant is an exhaust system of an internal combustion engine.

14. The method according to claim 13, wherein said first parameter is a temperature parameter of a down-stream-treatment device installed in the exhaust system and said second parameter is a parameter indicating the exothermic state of the down-stream-treatment device.

15. The method according to claim 9, wherein said plant is a rechargeable battery and wherein said first parameter is a parameter indicating the amount of charge to the battery, and said second parameter is a parameter indicating the exothermic state of the battery.

16. A computer program for controlling the temperature of a plant provided with a temperature sensor producing outputs indicative of the plant temperature, said computer program when executed on a computer perform:
    calculating an estimated value of the temperature of said plant using a correlation model between a first parameter regarding said plant and a second parameter regarding a plant model, said plant model being constructed to calculate said estimated temperature value;
    controlling the temperature of said plant based on said calculated estimated temperature value of the plant;
    calculating correction coefficients based on the output of said temperature sensor and said calculated estimated temperature value of the plant, said correction coefficients adjusting the height of a plurality of functions, and said plurality of functions being defined in a range of a plurality of the first parameters for said correlation model; and
    correcting said correlation model by said plurality of functions and said correction coefficients.

17. The computer program according to claim 16, further performing:
    providing a temperature sensor model for calculating an estimated output value of said temperature sensor with an input of said estimated temperature value; and
    setting said correction coefficients that adjust the height of the plurality of functions to minimize the error between said output from the temperature sensor and said calculated estimated output value of the temperature sensor.

18. The computer program according to claim 16, wherein said correction coefficients are calculated according to a response-specifying control algorithm.

19. The computer program according to claim 16, wherein said plurality of functions are set to intersect with each other in the range of first parameter whose rate of change is higher than that of the second parameter.

20. The computer program according to claim 16, wherein said plant is an exhaust system of an internal combustion engine and wherein said first parameter is a temperature parameter of a down-stream-treatment device installed in the exhaust system and said second parameter is a parameter indicating the exothermic state of the down-stream-treatment device.

21. The computer program according to claim 16, wherein said plant is a rechargeable battery and wherein said first parameter is a parameter indicating the amount of charge to the battery, and said second parameter is a parameter indicating the exothermic state of the battery.

* * * * *